US010122692B2

(12) United States Patent
MacCarthaigh

(10) Patent No.: US 10,122,692 B2
(45) Date of Patent: Nov. 6, 2018

(54) HANDSHAKE OFFLOAD

(71) Applicant: Amazon Technologies, Inc., Seattle, WA (US)

(72) Inventor: Colm MacCarthaigh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/741,384

(22) Filed: Jun. 16, 2015

(65) Prior Publication Data

US 2016/0373414 A1    Dec. 22, 2016

(51) Int. Cl.
*H04L 29/06* (2006.01)
*H04L 29/08* (2006.01)

(52) U.S. Cl.
CPC ...... *H04L 63/0435* (2013.01); *H04L 63/0281* (2013.01); *H04L 63/0442* (2013.01); *H04L 67/1004* (2013.01); *H04L 63/168* (2013.01)

(58) Field of Classification Search
None
See application file for complete search history.

(56) References Cited

U.S. PATENT DOCUMENTS

| | | | |
|---|---|---|---|
| 5,179,591 A | 1/1993 | Hardy et al. | |
| 5,200,999 A | 4/1993 | Matyas et al. | |
| 5,497,421 A | 3/1996 | Kaufman et al. | |
| 5,727,196 A | 3/1998 | Strauss, Jr. et al. | |
| 5,822,400 A | 10/1998 | Smith | |
| 6,084,969 A | 7/2000 | Wright et al. | |
| 6,094,485 A | 7/2000 | Weinstein et al. | |
| 6,097,817 A | 8/2000 | Bilgic et al. | |
| 6,125,446 A | 9/2000 | Olarig et al. | |
| 6,185,316 B1 | 2/2001 | Buffam | |
| 6,453,416 B1 | 9/2002 | Epstein | |
| 6,633,980 B1 | 10/2003 | Johnson | |
| 6,826,686 B1 | 11/2004 | Peyravian et al. | |
| 6,836,765 B1 | 12/2004 | Sussman | |

(Continued)

FOREIGN PATENT DOCUMENTS

CN    1503504    6/2004
WO    WO0241101    5/2002

(Continued)

OTHER PUBLICATIONS

International Search Report and Written Opinion dated Aug. 16, 2016, International Patent Application No. PCT/US2016/037427, filed Jun. 14, 2016.

(Continued)

*Primary Examiner* — Michael R Vaughan
(74) *Attorney, Agent, or Firm* — Davis Wright Tremaine LLP

(57) ABSTRACT

Cryptographically protected communications sessions are established using a distributed process. A server proxies handshake messages to another computer system that negotiates a cryptographically protected communications session with the client. When the client and other computer system complete negotiation of the session, the other computer system provides a set of session keys to the server. The server then uses the session keys to communicate with the client over the cryptographically protected communications session.

24 Claims, 12 Drawing Sheets

(56) References Cited

U.S. PATENT DOCUMENTS

| | | | |
|---|---|---|---|
| 6,851,054 B2 | 2/2005 | Wheeler et al. | |
| 6,957,393 B2 | 10/2005 | Fano et al. | |
| 6,959,394 B1 | 10/2005 | Brickell et al. | |
| 6,985,583 B1 | 1/2006 | Brainard et al. | |
| 7,010,689 B1 | 3/2006 | Matyas et al. | |
| 7,073,195 B2 | 4/2006 | Brickell et al. | |
| 7,139,917 B2 | 11/2006 | Jablon | |
| 7,146,505 B1 | 12/2006 | Harada et al. | |
| 7,219,223 B1 | 5/2007 | Bacchus et al. | |
| 7,228,417 B2 | 6/2007 | Roskind | |
| 7,233,948 B1 | 6/2007 | Shamoon et al. | |
| 7,320,076 B2 | 1/2008 | Caronni | |
| 7,334,125 B1 | 2/2008 | Pellacuru | |
| 7,363,495 B2 * | 4/2008 | Felt | G06Q 20/3829 713/170 |
| 7,428,306 B2 | 9/2008 | Celikkan et al. | |
| 7,508,945 B1 | 3/2009 | Ferre Herrero | |
| 7,512,965 B1 | 3/2009 | Amdur et al. | |
| 7,631,182 B1 | 12/2009 | Droux et al. | |
| 7,685,430 B1 | 3/2010 | Masurkar | |
| 7,721,322 B2 | 5/2010 | Sastry et al. | |
| 7,757,271 B2 | 7/2010 | Amdur et al. | |
| 7,765,584 B2 | 7/2010 | Roskind | |
| 7,836,306 B2 | 11/2010 | Pyle et al. | |
| 7,853,782 B1 | 12/2010 | Geddes | |
| 7,890,767 B2 | 2/2011 | Smith et al. | |
| 7,913,084 B2 | 3/2011 | Medvinsky et al. | |
| 7,917,764 B2 | 3/2011 | Futa | |
| 8,006,289 B2 | 8/2011 | Hinton et al. | |
| 8,024,562 B2 | 9/2011 | Gentry et al. | |
| 8,041,954 B2 | 10/2011 | Plesman | |
| 8,059,820 B2 | 11/2011 | Malaviarachchi et al. | |
| 8,151,116 B2 | 4/2012 | van de Horst et al. | |
| 8,181,035 B1 | 5/2012 | Fernandez Gutierrez | |
| 8,275,356 B2 | 9/2012 | Hickie | |
| 8,327,128 B1 | 12/2012 | Prince et al. | |
| 8,332,922 B2 | 12/2012 | Dickinson et al. | |
| 8,370,638 B2 | 2/2013 | Duane et al. | |
| 8,386,800 B2 | 2/2013 | Kocher et al. | |
| 8,387,117 B2 | 2/2013 | Eom et al. | |
| 8,418,222 B2 | 4/2013 | Gbadegesin et al. | |
| 8,423,759 B2 | 4/2013 | Moreau | |
| 8,453,198 B2 | 5/2013 | Band et al. | |
| 8,464,058 B1 | 6/2013 | Chen et al. | |
| 8,464,354 B2 | 6/2013 | Teow et al. | |
| 8,533,772 B2 | 9/2013 | Garg et al. | |
| 8,533,786 B2 * | 9/2013 | Chabbewal | G06F 21/41 380/277 |
| 8,543,916 B2 | 9/2013 | Anderson et al. | |
| 8,561,152 B2 | 10/2013 | Novak et al. | |
| 8,621,561 B2 | 12/2013 | Cross et al. | |
| 8,688,813 B2 | 4/2014 | Maes | |
| 8,695,075 B2 | 4/2014 | Anderson et al. | |
| 8,739,308 B1 | 5/2014 | Roth | |
| 8,745,205 B2 | 6/2014 | Anderson et al. | |
| 8,745,394 B1 | 6/2014 | Rahat et al. | |
| 8,776,190 B1 | 7/2014 | Cavage et al. | |
| 8,776,204 B2 | 7/2014 | Faynberg et al. | |
| 8,782,774 B1 | 7/2014 | Pahl et al. | |
| 8,799,641 B1 | 8/2014 | Seidenberg et al. | |
| 8,812,727 B1 * | 8/2014 | Sorenson, III | H04L 47/70 709/238 |
| 8,856,869 B1 | 10/2014 | Brinskelle | |
| 8,868,923 B1 | 10/2014 | Hamlet et al. | |
| 8,892,865 B1 | 11/2014 | Roth | |
| 8,966,267 B1 | 2/2015 | Pahl et al. | |
| 8,996,873 B1 | 3/2015 | Pahl et al. | |
| 9,002,018 B2 | 4/2015 | Wilkins et al. | |
| 9,531,705 B1 | 12/2016 | Mehner et al. | |
| 9,553,856 B2 | 1/2017 | Pahl et al. | |
| 9,780,952 B1 * | 10/2017 | Behm | H04L 9/3247 |
| 9,923,829 B1 | 3/2018 | Liu et al. | |
| 2001/0008013 A1 | 7/2001 | Johnson et al. | |
| 2001/0018739 A1 | 8/2001 | Anderson et al. | |
| 2002/0016840 A1 | 2/2002 | Herzog et al. | |
| 2002/0023010 A1 | 2/2002 | Rittmaster et al. | |
| 2002/0067832 A1 | 6/2002 | Jablon | |
| 2002/0099858 A1 | 7/2002 | Lindo et al. | |
| 2002/0112181 A1 | 8/2002 | Smith | |
| 2002/0114453 A1 | 8/2002 | Bartholet et al. | |
| 2002/0161723 A1 | 10/2002 | Asokan et al. | |
| 2002/0161998 A1 | 10/2002 | Cromer et al. | |
| 2002/0162019 A1 | 10/2002 | Berry et al. | |
| 2002/0194483 A1 | 12/2002 | Wenocur et al. | |
| 2002/0198848 A1 | 12/2002 | Michener | |
| 2003/0016826 A1 | 1/2003 | Asano et al. | |
| 2003/0037247 A1 | 2/2003 | Obara et al. | |
| 2003/0041110 A1 | 2/2003 | Wenocur et al. | |
| 2003/0048905 A1 | 3/2003 | Gehring et al. | |
| 2003/0135740 A1 | 7/2003 | Talmor et al. | |
| 2003/0145193 A1 | 7/2003 | Lee et al. | |
| 2003/0149781 A1 | 8/2003 | Yared et al. | |
| 2003/0182431 A1 | 9/2003 | Sturniolo et al. | |
| 2003/0188117 A1 | 10/2003 | Yoshino et al. | |
| 2003/0219018 A1 | 11/2003 | Van Der Burg et al. | |
| 2003/0226017 A1 | 12/2003 | Palekar et al. | |
| 2004/0030896 A1 | 2/2004 | Sakamura et al. | |
| 2004/0078593 A1 | 4/2004 | Hind et al. | |
| 2004/0088260 A1 | 5/2004 | Foster et al. | |
| 2004/0093396 A1 | 5/2004 | Akune | |
| 2004/0103096 A1 | 5/2004 | Larsen | |
| 2004/0107356 A1 | 6/2004 | Shamoon et al. | |
| 2004/0128505 A1 | 7/2004 | Larsen | |
| 2004/0128510 A1 | 7/2004 | Larsen | |
| 2004/0131185 A1 | 7/2004 | Kakumer | |
| 2004/0139335 A1 | 7/2004 | Diamand et al. | |
| 2004/0143733 A1 | 7/2004 | Ophir et al. | |
| 2004/0158734 A1 | 8/2004 | Larsen | |
| 2004/0172535 A1 | 9/2004 | Jakobsson et al. | |
| 2004/0184480 A1 | 9/2004 | Kangas et al. | |
| 2004/0243978 A1 | 12/2004 | Walmsley | |
| 2005/0036611 A1 | 2/2005 | Seaton et al. | |
| 2005/0043999 A1 | 2/2005 | Ji et al. | |
| 2005/0050362 A1 | 3/2005 | Peles | |
| 2005/0060547 A1 | 3/2005 | Saito et al. | |
| 2005/0060580 A1 | 3/2005 | Chebolu et al. | |
| 2005/0080914 A1 | 4/2005 | Lerner et al. | |
| 2005/0120213 A1 | 6/2005 | Winget et al. | |
| 2005/0132192 A1 | 6/2005 | Jeffries et al. | |
| 2005/0132215 A1 | 6/2005 | Wang et al. | |
| 2005/0144437 A1 | 6/2005 | Ransom et al. | |
| 2005/0166263 A1 | 7/2005 | Nanopoulos et al. | |
| 2005/0188193 A1 | 8/2005 | Kuehnel et al. | |
| 2005/0223216 A1 | 10/2005 | Chan et al. | |
| 2005/0235148 A1 | 10/2005 | Scheidt et al. | |
| 2005/0273862 A1 | 12/2005 | Benaloh et al. | |
| 2005/0278547 A1 | 12/2005 | Hyndman et al. | |
| 2006/0041938 A1 | 2/2006 | Ali | |
| 2006/0045273 A1 | 3/2006 | Mayer | |
| 2006/0070116 A1 | 3/2006 | Park | |
| 2006/0075462 A1 | 4/2006 | Golan et al. | |
| 2006/0094406 A1 | 5/2006 | Cortegiano | |
| 2006/0094410 A1 | 5/2006 | Cortegiano | |
| 2006/0095969 A1 | 5/2006 | Portolani et al. | |
| 2006/0100928 A1 | 5/2006 | Waleczak, Jr. et al. | |
| 2006/0130100 A1 | 6/2006 | Pentland | |
| 2006/0149677 A1 | 7/2006 | Shahine et al. | |
| 2006/0174125 A1 | 8/2006 | Brookner | |
| 2006/0190331 A1 | 8/2006 | Tollinger et al. | |
| 2006/0206440 A1 | 9/2006 | Anderson et al. | |
| 2006/0206925 A1 | 9/2006 | Dillaway et al. | |
| 2006/0218625 A1 | 9/2006 | Pearson et al. | |
| 2006/0230284 A1 | 10/2006 | Fiske | |
| 2006/0256961 A1 | 11/2006 | Brainard et al. | |
| 2006/0271785 A1 | 11/2006 | Holtmanns et al. | |
| 2006/0282878 A1 | 12/2006 | Stanley et al. | |
| 2006/0294366 A1 | 12/2006 | Nadalin et al. | |
| 2007/0005955 A1 | 1/2007 | Pyle et al. | |
| 2007/0033396 A1 | 2/2007 | Zhang et al. | |
| 2007/0037552 A1 | 2/2007 | Lee et al. | |
| 2007/0061571 A1 | 3/2007 | Hammes et al. | |
| 2007/0061885 A1 | 3/2007 | Hammes et al. | |
| 2007/0074282 A1 | 3/2007 | Black et al. | |
| 2007/0101133 A1 | 5/2007 | Liu et al. | |

(56) References Cited

U.S. PATENT DOCUMENTS

| | | |
|---|---|---|
| 2007/0136361 A1 | 6/2007 | Lee et al. |
| 2007/0157309 A1 | 7/2007 | Bin et al. |
| 2007/0174614 A1 | 7/2007 | Duane et al. |
| 2007/0180130 A1 | 8/2007 | Arnold et al. |
| 2007/0186102 A1 | 8/2007 | Ng |
| 2007/0204160 A1 | 8/2007 | Chan et al. |
| 2007/0206537 A1 | 9/2007 | Cam-Winget et al. |
| 2007/0234410 A1 | 10/2007 | Geller |
| 2007/0250706 A1 | 10/2007 | Oba |
| 2007/0271606 A1 | 11/2007 | Amann et al. |
| 2007/0277231 A1 | 11/2007 | Medvinsky et al. |
| 2007/0297430 A1 | 12/2007 | Nykanen et al. |
| 2008/0010665 A1 | 1/2008 | Hinton et al. |
| 2008/0013724 A1 | 1/2008 | Shamoon et al. |
| 2008/0022374 A1 | 1/2008 | Brown et al. |
| 2008/0040773 A1 | 2/2008 | AlBadarin et al. |
| 2008/0066150 A1 | 3/2008 | Lim |
| 2008/0070571 A1 | 3/2008 | Nguyen et al. |
| 2008/0080718 A1 | 4/2008 | Meijer et al. |
| 2008/0083036 A1 | 4/2008 | Ozzie et al. |
| 2008/0091763 A1 | 4/2008 | Devonshire et al. |
| 2008/0091944 A1 | 4/2008 | von Mueller et al. |
| 2008/0123859 A1 | 5/2008 | Mamidwar |
| 2008/0126813 A1 | 5/2008 | Kawakami |
| 2008/0130518 A1 | 6/2008 | Nishikata et al. |
| 2008/0137862 A1 | 6/2008 | Morita et al. |
| 2008/0141313 A1 | 6/2008 | Kato et al. |
| 2008/0163337 A1 | 7/2008 | Tuliani et al. |
| 2008/0168530 A1 | 7/2008 | Kuehr-McLaren et al. |
| 2008/0178240 A1 | 7/2008 | Ikeda et al. |
| 2008/0182592 A1 | 7/2008 | Cha et al. |
| 2008/0222694 A1 | 9/2008 | Nakae |
| 2008/0301444 A1 | 12/2008 | Kim et al. |
| 2008/0301630 A1 | 12/2008 | Arnold et al. |
| 2008/0313719 A1 | 12/2008 | Kaliski, Jr. et al. |
| 2009/0013402 A1 | 1/2009 | Plesman |
| 2009/0019134 A1 | 1/2009 | Bellifemine et al. |
| 2009/0049518 A1 | 2/2009 | Roman et al. |
| 2009/0059915 A1 | 3/2009 | Baker |
| 2009/0067633 A1 | 3/2009 | Dawson et al. |
| 2009/0106557 A1 | 4/2009 | Leonard |
| 2009/0132808 A1 | 5/2009 | Baentsch et al. |
| 2009/0169001 A1 | 7/2009 | Tighe et al. |
| 2009/0172793 A1 | 7/2009 | Newstadt et al. |
| 2009/0183225 A1 | 7/2009 | Malakapalli et al. |
| 2009/0190758 A1 | 7/2009 | Pourzandi et al. |
| 2009/0198713 A1 | 8/2009 | Sato et al. |
| 2009/0210712 A1 | 8/2009 | Fort |
| 2009/0217385 A1 | 8/2009 | Teow et al. |
| 2009/0254572 A1 | 10/2009 | Redlich et al. |
| 2009/0276830 A1 | 11/2009 | O'Connor |
| 2009/0296938 A1 | 12/2009 | Devanand et al. |
| 2009/0320093 A1 | 12/2009 | Glazier et al. |
| 2010/0017603 A1 | 1/2010 | Jones |
| 2010/0037304 A1 | 2/2010 | Canning et al. |
| 2010/0058060 A1 | 3/2010 | Schneider |
| 2010/0058072 A1 | 3/2010 | Teow et al. |
| 2010/0071056 A1 | 3/2010 | Cheng |
| 2010/0083001 A1 | 4/2010 | Shah et al. |
| 2010/0111296 A1 | 5/2010 | Brown et al. |
| 2010/0125894 A1 | 5/2010 | Yasrebi et al. |
| 2010/0131756 A1 | 5/2010 | Schneider |
| 2010/0142704 A1 | 6/2010 | Camenisch et al. |
| 2010/0205649 A1 | 8/2010 | Becker et al. |
| 2010/0223466 A1 | 9/2010 | Roskowski et al. |
| 2010/0239095 A1 | 9/2010 | Carter et al. |
| 2010/0251347 A1 | 9/2010 | Roskind |
| 2010/0260126 A1 | 10/2010 | Ulupinar et al. |
| 2010/0269156 A1 | 10/2010 | Hohlfeld et al. |
| 2010/0278338 A1 | 11/2010 | Chang et al. |
| 2010/0290476 A1 | 11/2010 | Brindle et al. |
| 2010/0299525 A1 | 11/2010 | Shah et al. |
| 2010/0306525 A1 | 12/2010 | Ferguson |
| 2010/0313275 A1 | 12/2010 | Ibrahim et al. |
| 2010/0322252 A1 | 12/2010 | Suganthi et al. |
| 2010/0332845 A1 | 12/2010 | Asaka |
| 2011/0004753 A1 | 1/2011 | Gomi et al. |
| 2011/0010538 A1 | 1/2011 | Falk |
| 2011/0035593 A1 | 2/2011 | Pyle et al. |
| 2011/0055562 A1 | 3/2011 | Adelman et al. |
| 2011/0055585 A1 | 3/2011 | Lee |
| 2011/0078107 A1 | 3/2011 | Almeida et al. |
| 2011/0083015 A1 | 4/2011 | Meier |
| 2011/0087882 A1 | 4/2011 | Kuo et al. |
| 2011/0093710 A1 | 4/2011 | Galvin et al. |
| 2011/0099362 A1 | 4/2011 | Haga et al. |
| 2011/0113244 A1 | 5/2011 | Chou et al. |
| 2011/0131415 A1 | 6/2011 | Schneider |
| 2011/0138192 A1 | 6/2011 | Kocher et al. |
| 2011/0167479 A1 | 7/2011 | Maes |
| 2011/0179469 A1 | 7/2011 | Blinn et al. |
| 2011/0185181 A1 | 7/2011 | Lin |
| 2011/0202755 A1 | 8/2011 | Orsini et al. |
| 2011/0231940 A1 | 9/2011 | Perumal et al. |
| 2011/0239283 A1 | 9/2011 | Chern |
| 2011/0252229 A1 | 10/2011 | Belenkiy et al. |
| 2011/0265172 A1 | 10/2011 | Sharma et al. |
| 2011/0280406 A1 | 11/2011 | Ma et al. |
| 2011/0296497 A1 | 12/2011 | Becker |
| 2011/0311055 A1 | 12/2011 | Parann-Nissany |
| 2011/0320606 A1 | 12/2011 | Madduri et al. |
| 2012/0017095 A1 | 1/2012 | Blenkhorn et al. |
| 2012/0020474 A1 | 1/2012 | Kudoh et al. |
| 2012/0023334 A1 | 1/2012 | Brickell et al. |
| 2012/0036551 A1 | 2/2012 | Le Saint et al. |
| 2012/0054625 A1 | 3/2012 | Pugh et al. |
| 2012/0060035 A1 | 3/2012 | Kalmady et al. |
| 2012/0106735 A1 | 5/2012 | Fukuda |
| 2012/0110636 A1 | 5/2012 | Van Biljon et al. |
| 2012/0144034 A1 | 6/2012 | McCarty |
| 2012/0159577 A1 | 6/2012 | Belinkiy et al. |
| 2012/0163597 A1 | 6/2012 | Pan et al. |
| 2012/0166818 A1 | 6/2012 | Orsini et al. |
| 2012/0233216 A1 | 9/2012 | Lim |
| 2012/0243687 A1 | 9/2012 | Li |
| 2012/0245978 A1 | 9/2012 | Jain |
| 2012/0265690 A1 | 10/2012 | Bishop et al. |
| 2012/0317414 A1 | 12/2012 | Glover |
| 2013/0013606 A1 | 1/2013 | Stanfill |
| 2013/0031255 A1 | 1/2013 | Maloy et al. |
| 2013/0080769 A1 | 3/2013 | Cha et al. |
| 2013/0086662 A1 | 4/2013 | Roth |
| 2013/0086663 A1 | 4/2013 | Roth et al. |
| 2013/0111217 A1 | 5/2013 | Kopasz et al. |
| 2013/0129079 A1 | 5/2013 | Swaminathan et al. |
| 2013/0132232 A1 | 5/2013 | Pestoni et al. |
| 2013/0145447 A1 | 6/2013 | Maron |
| 2013/0166918 A1 | 6/2013 | Shahbazi et al. |
| 2013/0191884 A1 | 7/2013 | Leicher et al. |
| 2013/0198519 A1 | 8/2013 | Marien |
| 2013/0212390 A1 | 8/2013 | Du et al. |
| 2013/0219189 A1 | 8/2013 | Simmons |
| 2013/0254536 A1 | 9/2013 | Glover |
| 2013/0282461 A1 | 10/2013 | Ovick et al. |
| 2013/0318347 A1 | 11/2013 | Moffat |
| 2013/0318630 A1 | 11/2013 | Lam |
| 2014/0013101 A1 | 1/2014 | Tanizawa et al. |
| 2014/0013409 A1 | 1/2014 | Halageri |
| 2014/0053241 A1 | 2/2014 | Norrman et al. |
| 2014/0067996 A1 | 3/2014 | Zhang |
| 2014/0068252 A1 | 3/2014 | Maruti et al. |
| 2014/0082715 A1 | 3/2014 | Grajek et al. |
| 2014/0122866 A1 | 5/2014 | Haeger et al. |
| 2014/0164768 A1 | 6/2014 | Kruglick |
| 2014/0181925 A1 | 6/2014 | Smith |
| 2014/0189808 A1 | 7/2014 | Mahaffey et al. |
| 2014/0208408 A1 | 7/2014 | Bilgen et al. |
| 2014/0237614 A1 | 8/2014 | Irvine |
| 2014/0281477 A1 | 9/2014 | Nayshtut et al. |
| 2014/0281487 A1 | 9/2014 | Klausen et al. |
| 2014/0283000 A1* | 9/2014 | Radhakrishnan ... H04L 63/1408 726/12 |
| 2014/0304415 A1* | 10/2014 | Prakash ............ H04L 47/70 709/226 |

(56) References Cited

U.S. PATENT DOCUMENTS

| | | |
|---|---|---|
| 2014/0317394 A1 | 10/2014 | Buhler et al. |
| 2014/0337236 A1 | 11/2014 | Wong et al. |
| 2014/0359698 A1 | 12/2014 | Sorenson et al. |
| 2015/0030155 A1 | 1/2015 | Park et al. |
| 2015/0082039 A1 | 3/2015 | Stalzer et al. |
| 2015/0089614 A1 | 3/2015 | Mathew et al. |
| 2015/0095648 A1 | 4/2015 | Nix |
| 2015/0106624 A1 | 4/2015 | Gero et al. |
| 2015/0113172 A1 | 4/2015 | Johnson et al. |
| 2015/0288514 A1 | 10/2015 | Pahl et al. |
| 2015/0341317 A1 | 11/2015 | Zombik |
| 2018/0026797 A1* | 1/2018 | Behm ............... H04L 9/3263 |

FOREIGN PATENT DOCUMENTS

| | | |
|---|---|---|
| WO | WO2006077822 | 7/2006 |
| WO | WO2008024705 | 2/2008 |
| WO | WO2012134218 | 10/2012 |
| WO | WO2014063361 | 5/2014 |

OTHER PUBLICATIONS

Amazon, "Amazon Prime Video—security considerations," Amazon.com General Help Forum, http://www.amazon.com/gp/help/customer/forums?ie=UTF8&cdForum=Fx2NFGOONPZEXIP&cdPage=1&cdSort=newest&cdThread=Tx18VZVGGU0Y32, latest reply Jun. 17, 2013, 3 pages.

Berners-Lee et al., "Uniform Resource Identifier (URI): Generic Syntax," Network Working Group Request for Comments: 3986, The Internet Society 2005 retrieved on Nov. 30, 2011, from http://www.ietf.org/rfc/rfc3986.txt.

Ghorbei-Talbi et al., "Managing Delegation in Access Control Models," International Conference on Advanced Computing and Communications, pp. 744-751, Dec. 18-21, 2007.

International Search Report and Written Opinion dated Dec. 30, 2014 in International Patent Application No. PCT/US2014/057043, filed Sep. 23, 2014.

International Search Report and Written Opinion dated Dec. 30, 2014 in International Patent Application No. PCT/US2014/057051, filed Sep. 23, 2014.

International Search Report and Written Opinion dated Oct. 22, 2014, International Patent Application No. PCT/US2014/042569, filed Jun. 16, 2014.

Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

Massachusetts Institute of Technology, "Kerberos V5 System Administrator's Guide [online]," May 2012 [retrieved on Jun. 27, 2012], Retrieved from the Internet: http://web.mit.edu/kerberos/krb5-1.10/krb5-1.10.2/doc/krb5-admin.html, 57 pages.

Massachusetts Institute of Technology, "Kerberos V5 Installation Guide [online]," May 2012 [retrieved on Jun. 27, 2012], retrieved from the Internet: http://web.mit.edu/kerberos/krb5-1.10/krb5-1.10.2/doc/krb5-install.htm, 65 pages.

Massachusetts Institute of Technology, "Kerberos V5 UNIX User's Guide," dated May 2012, retrieved on Jun. 28, 2012, from <http://web.mit.edu/kerberos/krb5-1.10/krb5-1.10.2/doc/krb5-user.html>, 38 pages.

Patent Cooperation Treaty, "Notification of Transmittal of the International Search Report and the Written Opinion of the International Searching Authority, or the Declaration," issued to International Application No. PCT/US/058083 dated Dec. 27, 2012.

Roth et al.,"Hierarchical Data Access Techniques," U.S. Appl. No. 13/431,882, filed Mar. 27, 2012.

Simpson, "PPP Challenge Handshake Authentication Protocol (CHAP)," Network Working Group, Aug. 1996, retrieved from Internet Jun. 27, 2012, https://tools.ietf.org/html/rfc1994, 13 pages.

U.S. Appl. No. 13/431,760, filed Mar. 27, 2012.

U.S. Appl. No. 13/431,898, filed Mar. 27, 2012.

Wang et al., "Extending the Security Assertion Markup Language to Support Delegation for Web Services and Grid Services," IEEE International Conference on Web Services 1:67-74, Jul. 11-15, 2005.

Wikipedia, "Physical unclonable function," retrieved Aug. 22, 2013, from http://en.wikipedia.org/wiki/Physical_unclonable_function, 8 pages.

TCG Published, "TPM Main Part 1 Design Principles," Specification Version 1.2, Revision 116, Mar. 1, 2011, 184 pages.

TCG Published, "TPM Main Part 2 TPM Structures," Specification Version 1.2, Level 2 Revision 116, Mar. 1, 2011, 202 pages.

TCG Published, "TPM Main Part 3 Commands," Specification Version 1.2, Level 2 Revision 116, Mar. 1, 2011, 339 pages.

Gutmann, P., "Encrypt-then-MAC for Transport Layer Security (TLS) and Datagram Transport Layer Security (DTLS)," Request for Comments: 7366, Standards Track, Sep. 2014, 7 pages.

Merkle, J. et al., "Elliptic Curve Cryptography (ECC) Brainpool Curves for Transport Layer Security (TLS)," Request for Comments: 7027, Informational, Oct. 2013, 10 pages.

McGrew, D. et al., "AES-CCM Cipher Suites for Transport Layer Security (TLS)," Request for Comments: 6655, Standards Track, Jul. 2012, 8 pages.

Salter, M. et al., "Suite B Profile for Transport Layer Security (TLS)," Request for Comments: 6460, Informational, Jan. 2012, 14 pages.

Kanno, S. et al., "Addition of the Camellia Cipher Suites to Transport Layer Security (TLS)," Request for Comments: 6367, Informational, Sep. 2011, 8 pages.

Rescorla, E. et al., "Datagram Transport Layer Security Version 1.2," Request for Comments: 6347, Standards Track, Jan. 2012, 32 pages.

Kim, W. et al., "Addition of the ARIA Cipher Suites to Transport Layer Security (TLS)," Request for Comments: 6209, Informational, Apr. 2011, 9 pages.

Turner, S. et al., "Prohibiting Secure Sockets Layer (SSL) Version 2.0," Request for Comments: 6176, Standards Track, Mar. 2011, 4 pages.

Mavrogiannopoulos N. et al., "Using OpenPGP Keys for Transport Layer Security (TLS) Authentication," Request for Comments: 6091, Informational, Feb. 2011, 9 pages.

Eastlake, E., "Transport Layer Security (TLS) Extensions: Extension Definitions," Request for Comments: 6066, Standards Track, Jan. 2011, 25 pages.

Tuexen, M. et al., "Datagram Transport Layer Security (DTLS) for Stream Control Transmission Protocol (SCTP)," Request for Comments: 6083, Standards Track, Jan. 2011, 9 pages.

Kato, A. et al., "Camellia Cipher Suites for TLS," Request for Comments: 5932, Standards Track, Jun. 2010, 6 pages.

Brown, M. et al., "Transport Layer Security (TLS) Authorization Extensions," Request for Comments: 5878, Experimental, May 2010, 19 pages.

McGrew, D. et al., "Datagram Transport Layer Security (DTLS) Extension to Establish Keys for the Secure Real-time Transport Protocol (SRTP)," Request for Comments: 5764, Standards Track, May 2010, 26 pages.

Rescorla, E. et al., "Transport Layer Security (TLS) Renegotiation Indication Extension," Request for Comments: 5746, Standards Track, Feb. 2010, 15 pages.

Rescorla, E., "TLS Elliptic Curve Cipher Suites with SHA-256/384 and AES Galois Counter Mode (GCM)," Request for Comments: 5289, Informational, Aug. 2008, 6 pages.

Salowey, J., "AES Galois Counter Mode (GCM) Cipher Suites for TLS," Request for Comments: 5288, Standards Track, Aug. 2008, 8 pages.

Dierks, T. et al., "The Transport Layer Security (TLS) Protocol Version 1.2," Request for Comments: 5246, Standards Track, Aug. 2008, 104 pages.

(56) References Cited

OTHER PUBLICATIONS

Phelan, T., "Datagram Transport Layer Security (DTLS) over the Datagram Congestion Control Protocol (DCCP)," Request for Comments: 5238, Standards Track, May 2008, 10 pages.
Mavrogiannopoulos, N., "Using OpenPGP Keys for Transport Layer Security (TLS) Authentication," Request for Comments: 5081, Experimental, Nov. 2007, 8 pages.
Salowey, J. et al., "Transport Layer Security (TLS) Session Resumption without Server-Side State," Request for Comments: 5077, Standards Track, Jan. 2008, 20 pages.
Taylor, D. et al., "Using the Secure Remote Password (SRP) Protocol for TLS Authentication," Request for Comments: 5054, Informational, Nov. 2007, 24 pages.
Blumenthal, U. et al., "Pre-Shared Key (PSK) Ciphersuites with NULL Encryption for Transport Layer Security (TLS)," Request for Comments: 4785, Standards Track, Jan. 2007, 5 pages.
Santesson, S. et al., "TLS User Mapping Extension," Request for Comments: 4681, Standards Track, Oct. 2006, 11 pages.
Santesson, S., "TLS Handshake Message for Supplemental Data," Request for Comments: 4680, Standards Track, Sep. 2006, 9 pages.
Blake-Wilson, S. et al., "Elliptic Curve Cryptography (ECC) Cipher Suites for Transport Layer Security (TLS)," Request for Comments: 4492, Informational, May 2006, 35 pages.
Blake-Wilson, S. et al., "Transport Layer Security (TLS) Extensions," Request for Comments: 4366, Standards Track, Apr. 2006, 30 pages.
Rescorla, E. et al., "Datagram Transport Layer Security," Request for Comments: 4347, Standards Track, Apr. 2006, 25 pages.
Eronen, P. et al., "Pre-Shared Key Ciphersuites for Transport Layer Security (TLS)," Request for Comments: 4279, Standards Track, Dec. 2005, 15 pages.
Ford-Hutchinson, P., "Securing FTP with TLS," Request for Comments: 4217, Standards Track, Oct. 2005, 29 pages.
Lee, H.J. et al., "Addition of SEED Cipher Suites to Transport Layer Security (TLS)," Request for Comments: 4162, Standards Track, Aug. 2005, 6 pages.
Moriai, S. et al., "Addition of Camellia Cipher Suites to Transport Layer Security (TLS)," Request for Comments: 4132, Standards Track, Jul. 2005, 7 pages.
Friend, R., "Transport Layer Security (TLS) Protocol Compression Using Lempel-Ziv-Stac (LZS)," Request for Comments: 3943, Informational, Nov. 2004, 13 pages.
Hollenbeck, S., "Transport Layer Security Protocol Compression Methods," Request for Comments: 3749, Standards Track, May 2004, 8 pages.
Blake-Wilson, S. et al., "Transport Layer Security (TLS) Extensions," Request for Comments: 3546, Standards Track, Jun. 2003, 29 pages.
Chown, P., "Advanced Encryption Standard (AES) Ciphersuites for Transport Layer Security (TLS)," Request for Comments: 3268, Standards Track, Jun. 2002, 7 pages.
Hoffman, P., "SMTP Service Extension for Secure SMTP over Transport Layer Security," Request for Comments: 3207, Standards Track, Feb. 2002, 9 pages.
Dierks, T. et al., "The TLS Protocol Version 1.0," Request for Comments: 2246, Standards Track, Jan. 1999, 80 pages.
Newman, C., "Using TLS with IMAP, POP3 and ACAP," Request for Comments: 2595, Standards Track, Jun. 1999, 15 pages.
Medvinsky, A. et al., "Addition of Kerberos Cipher Suites to Transport Layer Security (TLS)," Request for Comments: 2712, Standards Track, Oct. 1999, 7 pages.
Khare, R. et al., "Upgrading to TLS Within HTTP/1.1," Request for Comments: 2817, Standards Track, May 2000, 13 pages.
Rescorla, E., "HTTP Over TLS," Request for Comments: 2818, Informational, May 2000, 7 pages.
Badra et al., "Key-Exchange Authentication Using Shared Secrets," IEEE Mar. 2006, 39(3):58-66.
Glenn et al., "The NULL Encryption Algorithm and Its Use With IPsec," Internet Engineering Task Force (IETF) Request for Comments: 2410, Category: Standards Track, Nov. 1998, 6 pages.
Carvalho et al., "Moving-Target Defenses for Computer Networks," Florida Institute of Technology, Copublished by the IEEE Computer and Reliability Societies, Mar./Apr. 2014, pp. 73-76.

\* cited by examiner

HANDSHAKE OFFLOAD

CROSS REFERENCE TO RELATED APPLICATION

This application incorporates by reference for all purposes the full disclosure of co-pending U.S. patent application Ser. No. 14/741,386, filed concurrently herewith, entitled "LOAD BALANCING WITH HANDSHAKE OFFLOAD."

BACKGROUND

Various techniques have been developed to improve the security of information accessible via computer networks. Various protocols for cryptographically protected communications sessions, for instance, provide mechanisms to ensure the confidentiality and/or integrity of data passing between two devices on a network. At the same time, computer systems themselves have become more sophisticated. A distributed computer system, for instance, may comprise multiple individual computer systems that communicate over a network, each playing a particular role in the distributed computer system. Moreover, services provided by distributed computer systems can involve complex orchestration among multiple individual computer systems. While many conventional protocols for cryptographically protected communications sessions provide high levels of security between pairs of computer systems, their use in such distributed computer systems can be highly complex and cumbersome to manage due to the number of computer systems involved.

In addition, operators of websites and other systems find themselves in a predicament in which the more popular a system is, the more valuable the system is, and the more attractive the system is to those with malicious intent. At the same time, the more popular a system is, the greater the number of separate computing devices that support the system. A popular electronic commerce system, for example, may utilize thousands of webservers to handle consumer demand. To ensure the security of data utilized by such a system, a cryptographic key (e.g., a private key corresponding to a website certificate) may be provided to thousands of different devices. Management of such devices to protect the cryptographic key and, therefore, protect data, becomes increasingly difficult as the size of a system grows. At the same time, service providers with such systems often need flexibility to change the size of their systems to keep up with changes in demand.

BRIEF DESCRIPTION OF THE DRAWINGS

Various embodiments in accordance with the present disclosure will be described with reference to the drawings, in which.

DETAILED DESCRIPTION

Figure 1:
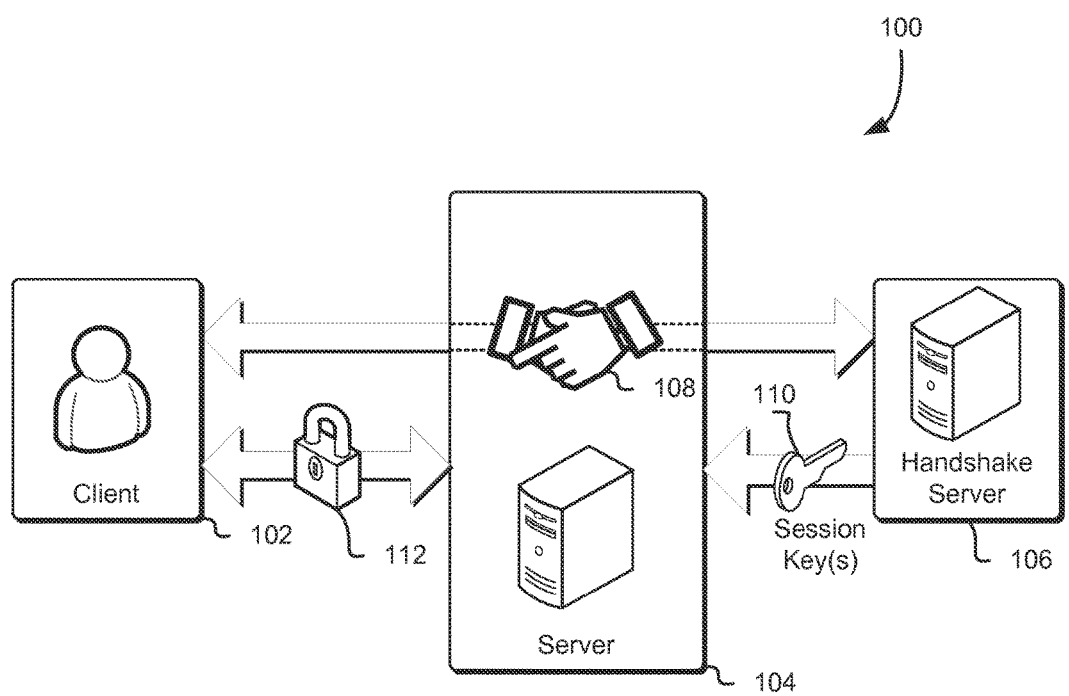
FIG. 1 shows an illustrative example of an environment in which various embodiments can be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order to not obscure the embodiment being described.

Techniques described and suggested herein include techniques for improving security of a digital system through the offload of handshake operations to establish cryptographically protected communications sessions, such as Secure Sockets Layer (SSL)/Transport Layer Security (TLS) sessions. In one example, a client makes a TCP connection with a server and initiates a handshake process (often referred to simply as a "handshake") to establish a cryptographically protected communications session with the server. For example, the client may transmit a ClientHello message in accordance with an SSL/TLS protocol. Instead of negotiating the parameters of the session (e.g., which protocol to use and which cryptographic keys to use) with the server, the server passes messages involved in the handshake to a separate computer system, which may be referred to as a "handshake server."

While the client sends handshake messages in communications addressed to the server, in actuality, the client negotiates the parameters of the session with the handshake server. When the handshake is complete, a cryptographically protected communications session is established and any cryptographic keys negotiated as part of the handshake are provided to the server to enable the server to communicate with the client over the established cryptographically protected communications session. Thus, for example, if the cryptographically protected communications session involves encrypted communications, the client is able to encrypt data that the server (and not other systems lacking authorization) can decrypt and, similarly, the server is able to encrypt data that the client (and not others lacking authorization) can decrypt. The client and server are also able to perform data integrity checking when a protocol being used includes such a feature.

In another example, a load balancer is configured with an ability to distinguish different types of traffic. When the load balancer receives a message addressed to a server, if the message is not a handshake message (i.e., a message that is part of a handshake protocol), the load balancer routes the message to the server or performs other processing on the message, such as to detect and prevent an attack as described in more detail below. If, however, the message is a handshake message, the server routes the message to a handshake server. In this manner, the client can negotiate the parameters of a cryptographically protected communications session with the handshake server without having to address such messages to the handshake server. When negotiation of the session parameters is complete, any cryptographic keys negotiated as part of the handshake may be provided by the handshake server to the server. In some implementations, the handshake server provides the cryptographic key(s) to the load balancer which, in turn, provides the cryptographic key(s) to the server. In other implementations, the handshake server provides the cryptographic key(s) to the server using a side channel (e.g., a separate connection and/or session) that bypasses the load balancer.

The techniques described herein, by enabling a server to communicate using a cryptographically protected communications session without access to a cryptographic key used to establish the cryptographically protected communications session, provide additional flexibility for the management of cryptographic keys. For instance, the techniques noted above and described in more detail below enable a server and a handshake server to be hosted and/or managed by different entities. In one example, a customer of a computing resource service provider uses computing resources (e.g., computer system instances, data storage devices, and the like) hosted in one or more data centers of the computing resource service provider to operate a website. The techniques described above allow the customer to utilize such services to operate the website without providing the computing resource service provider the private cryptographic key corresponding to the website's digital certificate. For instance, the customer may host one or more handshake servers in its own data center and/or may utilize a different service provider to host the one or more handshake servers. As another example, a computing resource service provider can provide handshake server services where the service provider provisions and operates handshake servers on behalf of customers, thereby enabling customers to operate web servers without having to worry about cryptographic key management.

FIG. 1 shows an illustrative example of an environment 100 in which various embodiments can be practiced. In the environment 100, a client 102 communicates with a server 104. The client computer system 102 (referred to simply as a "client") and the server computer system 104 (referred to simply as a "server") may be computer systems such as described below. For example, the server 104 may be a web server, database server, application server, or, generally, any device configured to operate in accordance with a protocol for cryptographically protected communications sessions. The client 104, accordingly, may be a device configured to operate in accordance with a protocol for cryptographically protected communications sessions for at least access to the server 104. In this particular example, the client 102 communicates with the server 104 to establish a cryptographically protected communications session, such as an SSL/TLS session, with the server 204. A cryptographically protected communications session, in an embodiment, is a set of parameters for communication between computer systems in a manner that provides at least one mode of cryptographic protection, where cryptographic protection may come in the form of data confidentiality (e.g., by way of encryption), data authenticity (e.g., that the data is from a particular entity), and/or data integrity (e.g., that the data has not been modified in transit). A computer system may be said to communicate over a cryptographically protected communications session by utilizing the parameters of the session (e.g., by encrypting data using a cryptographic key negotiated to establish the session).

Note that various security enhancements may be made in systems employing various techniques described herein. For example, the handshake server 106 and server 104 may be configured such that access to the handshake server 106 is more difficult to obtain than access to the server 104. As an example, a set of people may have credentials sufficient for logging into the server 104. Another set of people may have credentials sufficient for logging into the handshake server 106. The set of people who can log into the handshake server 106 may be smaller than the set of people who can log into the server 104. Further, relative to the server 104, those who can log into the handshake server 106 may be subject to higher security requirements and/or the handshake server 106 may be configured to require stronger authentication for login. In addition, the handshake server 106 may be inaccessible via a publicly routable communications network such as the Internet, thereby reducing the potential for unauthorized access to the handshake server 106. The handshake server 106 may, for instance, lack a public Internet Protocol (IP) address and may be situated in a network without an interface to a public network.

To communicate over a cryptographically protected communications session, in various embodiments, the server 104 utilizes the participation of a handshake server 106. The handshake server may be a computer system, such as described below, that is configured to implement one or more handshake protocols to perform handshake processes for the purpose of establishing cryptographically protected communications sessions for the server 104 and, if applicable, for other servers in a fleet of servers. As illustrated in FIG. 1, the client performs a handshake 108 with the handshake server 106. From the perspective of the client 102, however, the client 102 operates as if performing the handshake 108 with the server 104. Messages involved in the handshake 108 from the client 102 may be addressed to the server 104. The server 104 may be configured to proxy messages involved in the handshake 108 to the handshake server 106. Similarly, the server 104 may be configured to proxy messages from the handshake server 106 addressed to the server 104 to the client 102. In this manner, handshake messages from the client 102 are routed to the handshake server 106, and handshake messages from the handshake server 106 are routed to the client 102.

Once the handshake between the client 102 and the handshake server 106 is complete, the handshake server 106 may provide a set of session keys 110 to the server 104. The handshake server 106 may provide the set of session keys 110 to the server 104 through a variety of mechanisms in various embodiments. For example, the handshake server 106 and server 104 may utilize a cryptographically protected communications session (e.g., an SSL/TLS session) to communicate including transferring the set of session keys 110 from the handshake server 106 to the server 104. Other mechanisms, such as a direct, physical connection, may also be used to enhance security in addition to or instead of cryptographic protection of communications between the handshake server 106 and the server 104.

In an embodiment, establishment of cryptographically protected communications sessions involves the use of asymmetric key pairs (i.e., where an asymmetric key pair is a pair of cryptographic keys comprising a public cryptographic key (public key) and a private cryptographic key (private key)). For instance, the server 104 or the handshake server 106 may provide (e.g., through the server 104) a digital certificate to the client 102, where the digital certificate encodes a public key that corresponds to a private key held as a secret by the handshake server 106. The client 102 can use the public key to encrypt information that is only decryptable by an entity (e.g., the handshake server) with access to the private key to enable establishment of a cryptographically protected communications session. Another asymmetric key pair can be used to establish a cryptographically protected communications session between the handshake server so that, for instance, the server 104 can receive a digital certificate (which may be the same digital certificate or a different digital certificate which, therefore, corresponds to a different asymmetric key pair) from the handshake server 106 to enable the server 104 to encrypt information to be decrypted by the handshake server 106 for use in establishing a cryptographically protected communications session with the server 104. Note that in numerous variations considered as being within the scope of the present disclosure, a digital certificate can come from any entity (e.g., client 102, server 104, and/or handshake server 106) and a recipient can use the public key encoded by the digital certificate to encrypt information to be used in establishment of a cryptographically protected communications session.

The set of session keys 110 may comprise a set of cryptographic keys that includes an encryption key (to encrypt messages so as to be decryptable by the client), a decryption key (to decrypt messages from the client), a data integrity key for verifying the integrity of data transmitted to the client, and another data integrity key for rendering message integrity verifiable by the client. The data integrity keys may, for instance, be used to generate message authentication codes. Note, however, that the scope of the present disclosure extends to different size sets of cryptographic keys, such as sets comprising a single cryptographic key, and sets of cryptographic keys having two keys, three keys, and more than four keys. The particular keys in the set of session keys 110 may vary in accordance with various protocols for establishing cryptographically protected communications sessions. Note also that the set of session keys may be encoded in a single data object which itself may be referred to as a key or cryptographic key or symmetric cryptographic key.

As discussed in more detail below, by enabling the client 102 to perform the handshake 108 with the handshake server 106, the security of a cryptographic key used to establish a cryptographically protected communications session (such as a private cryptographic key of a public-private key pair) can be better protected. For example, the handshake server 106 may be located in a private network so as to be inaccessible via a public network. Access to the handshake server 106 can be more limited than to the server 104, since the handshake server does not need to perform additional operations that the server 104 would perform. The handshake server 106 may also be provided with a more limited application programming interface (API), limiting the operations that the handshake server 106 can perform in response to calls made over a network. Further, as illustrated in FIG. 1, the client 102 may receive the benefit of enhanced security allowed by performance of the handshake 108 with the handshake server 106 without requiring any special executable code. In the example of the protocol for establishing cryptographically protected communications sessions being SSL/TLS, the client 102 may, for instance, utilize various existing SSL/TLS libraries that conform to the applicable SSL/TLS specifications. Other technical advantages are also achieved, some of which are discussed in more detail below.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

Figure 2:
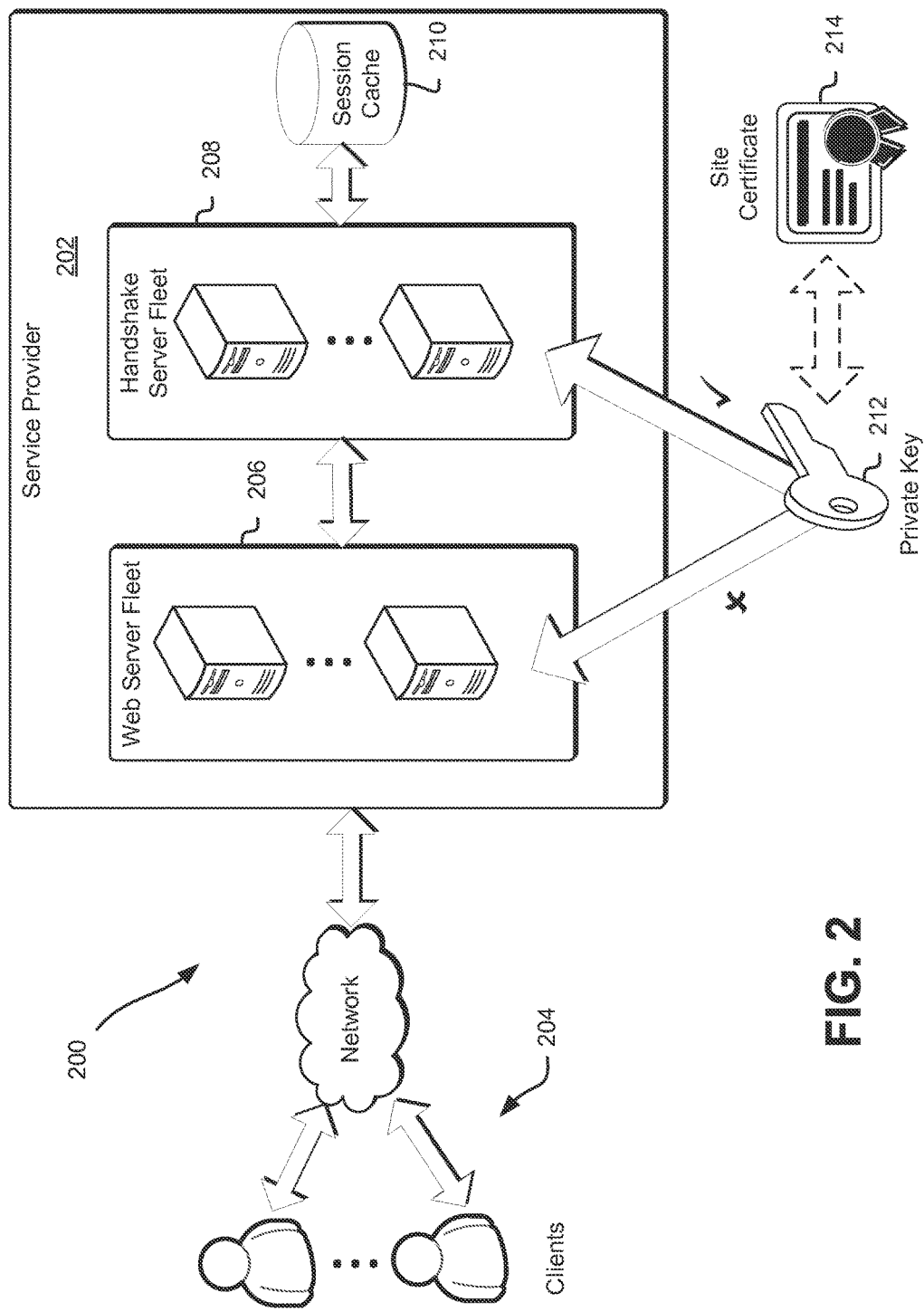
FIG. 2 shows an illustrative example of an environment that may incorporate the environment of FIG. 1 in accordance with an embodiment.

FIG. 2 shows an illustrative example of an environment 200 in which various embodiments can be practiced. In the example environment 200 illustrated in FIG. 2, a service provider 202 may operate a distributed computer system to provide various services to clients 204 where a client 204 may be a computer system of a customer of the service provider 202 that communicates with the service provider 202 for the purpose of accessing various services. In an embodiment, the service provider 202 includes a web server fleet 206 to provide a mechanism by which remote clients 204 can communicate with the service provider 202. The client 204 may, for example, submit requests over a network to the service provider 202 by communicating with various web servers of the web server fleet 206. Each web server in the web server fleet 206, in some embodiments, is configured to perform various operations described herein, such as proxying handshake communications to a handshake server of a handshake server fleet 208.

The web server fleet 206 may provide a mechanism by which the service provider 202 can scale its distributed system to handle traffic from its customers and/or other traffic, such as traffic from third parties not necessarily classified as customers (e.g. participants in a denial of service attack, automated agents, and other entities). As such, each of the web server fleet 206 and handshake server fleet 208 may comprise a plurality of different computing devices. Traffic to web servers of the web server fleet 206 and/or traffic to handshake servers of the handshake server fleet 208 may be by way of a load balancing computing device (load balancer) configured to employ one or more load balancing techniques. Further, a web server of the web server fleet 206 may have one or more long-term connections/sessions (e.g., TCP connections and/or TLS sessions) with one or more handshake servers of the handshake server fleet. In this manner, when a web server proxies handshake messages to a handshake server, in many instances, a new connection/session does not need to be established.

As illustrated in FIG. 2, the handshake server fleet 208 may have a central session cache 210 that, in an embodiment, is a data storage system that is configured to allow handshake servers of the handshake server fleet to cache cryptographically protected communications sessions utilizing various techniques that may vary upon the particular protocols used. For example, a handshake server of the handshake server fleet 208 may establish a cryptographically protected communications session with a client 204 to enable the client 204 to communicate over the cryptographically protected communications session with a web server of the web server fleet 206. The handshake server may cache the session in the session cache 210 such that if the client 204 connects to another web server of the web server fleet 206, the web server can use information stored in the session cache 210 to reestablish the cryptographically protected communications session with the other web server without having to perform an additional complete handshake. The session cache 210 can utilize session tickets or another mechanism to store the parameters of sessions to be available for later retrieval. In an embodiment, when a handshake server receives a message proxied by a web server to resume a session (e.g., a message with a session ID), the handshake server can query the cache for session parameters corresponding to a session specified by the message. If the session parameters are in the cache, the handshake server can use the session parameters to perform an abbreviated handshake and provide a set of session keys to the web server. The session cache 210 also provides a mechanism by which policies on cached sessions can be centrally administered and enforced. Various policies on the lifetime of sessions, for example, may be enforced by managing the time that sessions may remain in the session cache 210. Session information in the session cache 210 may be stored in association with respective session identifiers to enable location of information for a particular session.

In an example embodiment, the service provider 202 operates a website such as an electronic commerce website or generally any website used for the purpose of accessing services of the service provider. To enable clients 204 to determine that they are communicating with a computer system authorized to participate in providing the website, the service provider 202 may utilize a private cryptographic key 212 that has a respective public cryptographic key encoded in a site digital certificate 214, which may also encode a domain name of the website. As illustrated in FIG. 2, the private cryptographic key 212 is provided to a handshake server of the handshake server fleet and not to web servers of the web server fleet. In this manner, stronger protection of the private cryptographic key 212 may be enforced because, in some embodiments, the private cryptographic 212 is maintained in devices that are not directly accessible via a public communications network such as the internet. In this manner, even if one were to find and exploit a vulnerability of a web server in the web server fleet 206, thus obtaining access to the private cryptographic key 212 to impersonate the website of the service provider 202, would be extremely difficult. Even if an attacker were to obtain a copy of all the memory of a web server, the memory would not contain a copy of the private cryptographic key 212. Thus, the security of data accessible via the service provider 202 is greatly enhanced, which can be especially important when the data managed by the service provider 202 is data of the customers that communicate with the service provider 202 via the clients 204.

Figure 3:
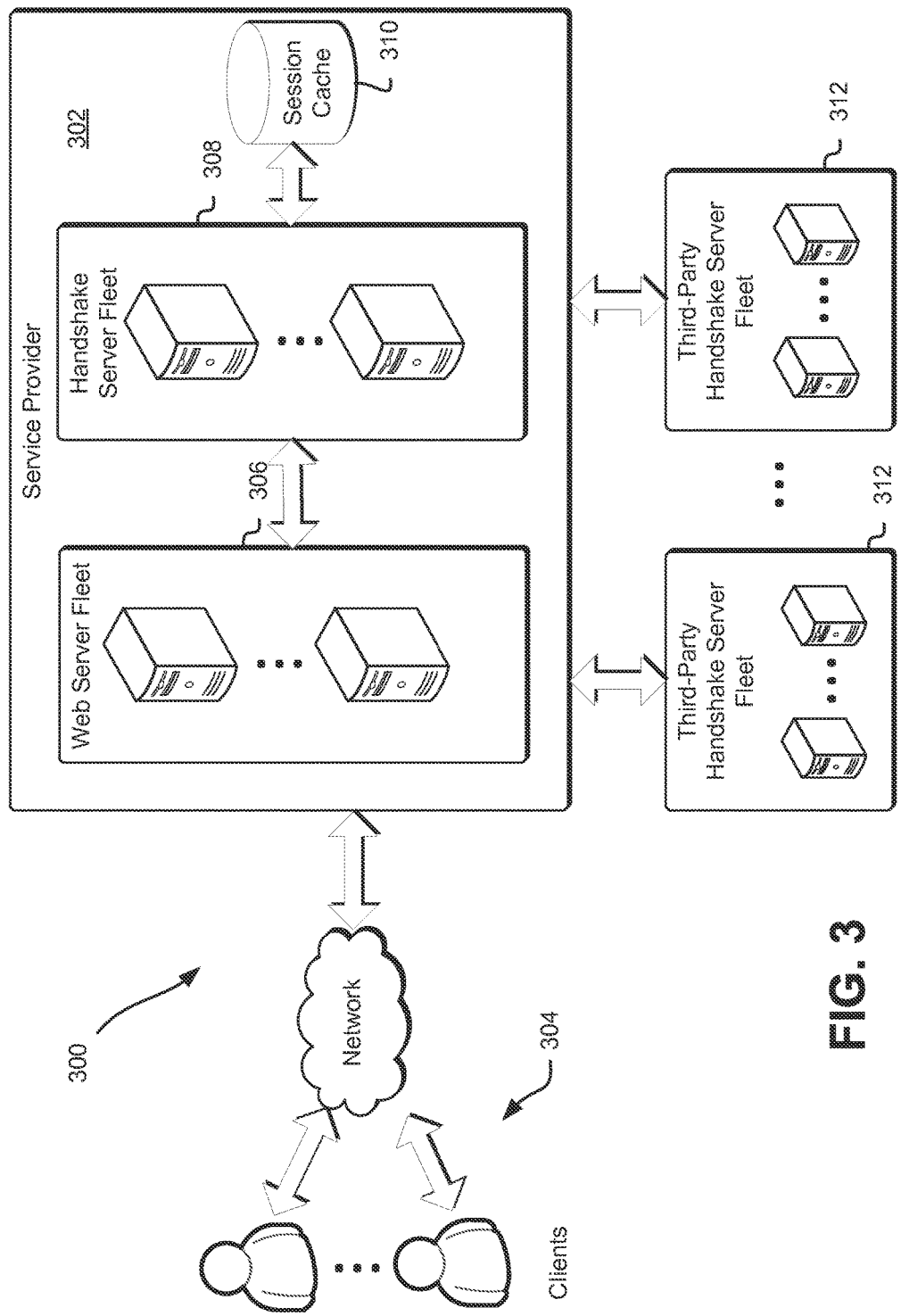
FIG. 3 shows another example of an environment in which various embodiments can be practiced.

FIG. 3 shows an illustrative example of an environment 300 which various embodiments may be practiced. In the environment 300, a service provider 302 provides various services using a distributed computer system hosted and/or operated by the service provider 302. Customers of the service provider 302 may communicate with the service provider via clients 304 that connect to web servers in a fleet of web servers 306, such as described above. As for FIG. 2 discussed above, the service provider 302, in an embodiment, includes a handshake server fleet 308, such as described above in connection with FIG. 2, to enable the web servers of the web server fleet 306 to proxy messages involved in handshakes to devices in the handshake server fleet 308. The service provider 302 may also utilize a session cache 310, such as discussed above.

In the example of FIG. 3, the environment 300 additionally includes one or more third-party handshake server fleets 312. A third-party handshake server fleet 312 may include one or more handshake servers that perform such as described above and in more detail below. In an embodiment, a third-party handshake server fleet is a fleet of handshake servers hosted and/or operated by an entity different from the service provider 302. In one example, the service provider is an infrastructure as a service (IaaS) service provider that hosts various computing resources on behalf of customers of the service provider 302. As an example, web servers in web server fleet 306 may be implemented using virtual machine instances or other computer system instances hosted by the service provider 302 (for example, in a virtual computer system service), but remotely and programmatically managed by customers of the service provider 302. In this example, the clients 304 may be customers of the customers of the service provider 304, although another example is that the clients 304 are the customers of the service provider 302.

In the example of the service provider 302 being an IaaS service provider, a third-party handshake server fleet may be hosted in a data center of the service provider 302, or generally in a separate facility than computer systems of the service provider 302. In this manner, customers of the service provider 302 may utilize the services of the service provider 302 and take advantage of IaaS services without providing the service provider 302 access to sensitive cryptographic material, such as private cryptographic keys corresponding to public cryptographic keys encoded in website digital certificates. In another example, a third-party handshake server fleet 312 is hosted by the service provider 302, but is managed by a customer of the service provider 302. As an example, in some instances, the service provider 302 provides a virtual computer system service that enables customers to programmatically manage virtual computer systems through the submission of application programming interface (API) calls to the service provider. In an embodiment, a third-party handshake server fleet 312 is hosted by the service provider 302, but programmatically managed by a customer of the service provider 302. In this manner, while the service provider 302 may have access to the hardware used to implement the handshake servers of the third-party handshake server fleet 312, various techniques can be employed to leave management of sensitive cryptographic material to the customers. For example, service providers such as the service provider 302 may generally as a policy avoid accessing data inside of a virtual computer system, and a service provider may additionally employ various techniques to prevent unauthorized access into the memory allocated to the virtual machines.

In yet another example, a third-party handshake server fleet is operated by another service provider different from the Service provider 302. In this manner, the management of cryptographic material, such as private cryptographic keys corresponding to website certificates, may be left to a particular service provider, whereas management of other functions, such as web server management, may be left to another service provider. Other variations are also considered as being within the scope of present disclosure.

Note that in the example shown in FIG. 3, communications between a web server and a handshake server in the third-party handshake server fleet 312 may occur over a public communications network such as the internet. Accordingly, encryption authentication and/or other mechanism may be made. For example, a handshake server and a third-party handshake server fleet 312 may only process messages of a handshake server protocol that have been digitally signed by web server and/or client, and the handshake server may be configured to verify digital signatures of such communications. A third-party handshake server may establish a cryptographically protected communications session with one or more web servers to ensure the confidentiality of data passing over a public network, and establishment of the session may require successful authentication. Other mechanisms enhancing security may also be utilized.

In some embodiments, a web server and a handshake server share access to a symmetric cryptographic key. For example, the web server and handshake server can each have a copy of the same cryptographic key. As another example, the handshake server has a cryptographic key that can be used to derive a cryptographic key that the web server has or, in alternate embodiments, the web server has a cryptographic key that can be used to derive a cryptographic key that the handshake server has. For instance, one entity may have a copy of a cryptographic key K. Another entity may have a copy of a cryptographic key K'=HMAC(K, "parameter"), where "parameter" is an encoding of some limit on use of the key K, such as an identifier of the entity that has K' but not K. The "parameter" value may maintained not as a secret (e.g., may be a public value). Thus, an entity with a copy of K can derive K' by computing HMAC(K, "parameter"), and K' can be used to digitally sign a message M, such as by computing HMAC(M, K'). Because HMAC provides a symmetric digital signature, a reference signature of HMAC(M, K') can be computed to check a digital signature provided. Note that more complicated schemes may also be used. For example, multiple derivations may be used to derive a shared secret, such as by computing HMAC($K_i$, "parameter$_i$") where $K_i$=HMAC($K_{i-1}$, "parameter$_{i-1}$") and the iterations begin at $K_1$=HMAC(K, "parameter$_0$"). In this example, each "parameter$_i$" can be a different limitation on key use, such as an encoding of date, region, service identifier, hostname, and/or other information. Note that different functions may be used in place of HMAC, such as any one-way function. The phrase "one-way function" includes functions that are not necessarily one-way in the strict mathematical sense, but those that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. Note also that Note that the term "digital signature" includes any information usable to cryptographically verify authenticity of a message including information generated using an RSA-based digital scheme (such as RSA-PSS), the digital signature algorithm (DSA) and the elliptic curve digital signature algorithm (ECDSA), the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

Figure 4:
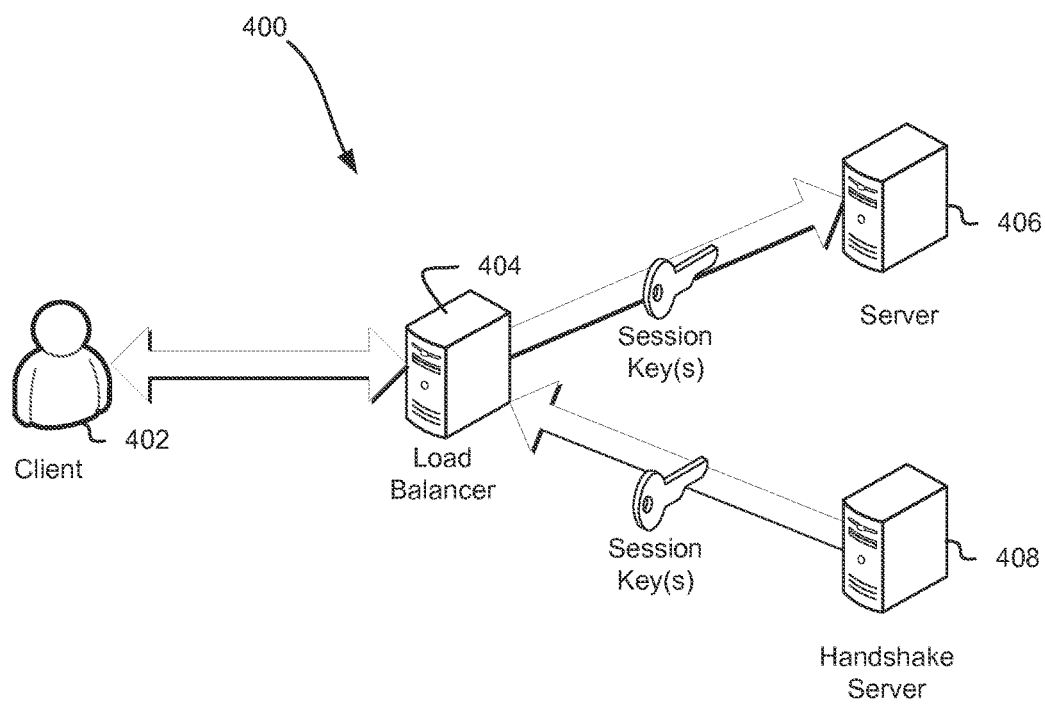
FIG. 4 shows an illustrative example of an environment in which various embodiments can be practiced where the figure illustrates a way of providing a server with a set of session keys in accordance with an embodiment.

As illustrated in FIG. 4, numerous variations of the techniques described herein involve technical advantages achieved in connection with distributed systems that utilize load balancing techniques. FIG. 4 accordingly shows an illustrative example of an environment 400 which includes a client 402, a load balancer 404, and a server 406. The environment 400 may be incorporated into one or more environments, such as described above and below. As an example, the server 404 may be a web server of a web server fleet, such as described above. A load balancer may be a computer system or a set of computer systems configured to apply load balancing techniques to network traffic. In addition, a load balancer may be configured to apply various techniques described herein, such as illustrated in FIG. 4 and other figures illustrating a load balancer. In particular, as illustrated in FIG. 4, the client 402 establishes a connection with the load balancer 404, such as to access a website that is accessible via multiple web servers that are provisioned for the purpose of managing demand on the website.

In an embodiment, the client 402 establishes a transmission control protocol (TCP) connection with the load balancer 404 and transmits messages to the load balancer 404 for the purpose of establishing a cryptographically protected communications session. As discussed above in connection with FIG. 1, the load balancer 404 may proxy network traffic involved in a handshake server process to a handshake server 408, enabling the client 402 to establish a cryptographically protected communications session, despite sending traffic addressed to the load balancer 404. The load balancer 404 may then proxy traffic outside of the handshake process to the server 406 for processing thereby. A load balancer 404 may perform additional operations such as attack detection and mitigation, such as described in more detail below.

Once the cryptographically protected communications session has been established by the client 402 and the handshake server 408, the handshake server 408 may provide a set of session keys to the load balancer 404. The handshake server 408 may, for instance, be configured (e.g., programmed) to send a message to the load balancer 404 with information associated with the client 402, such as a client identifier, a network address such as an IP address, a session identifier, or other information useable to distinguish the client 402 from other clients. The load balancer 404 may then provide the set of session keys received from the handshake server 408 to the server 406. In this manner, the server 406 may communicate with the client 402 over the cryptographically protected communications session, such as described above. For instance, the server 406 can decrypt encrypted traffic from the client 402 and may encrypt messages to the client 402 such that the client 402 is able to decrypt the messages. Note that, in some embodiments, the server 406 may remain unselected by the load balancer until the handshake partially or fully completes. For instance, the load balancer 404 may select the server 406 from multiple servers when the load balancer receives a set of session keys from the handshake server 408. In some embodiments, the load balancer 404 selects the server 406 before the handshake is complete (e.g., triggered establishment of a TCP connection with the client or receipt of a ClientHello message from the client.)

Figure 5:
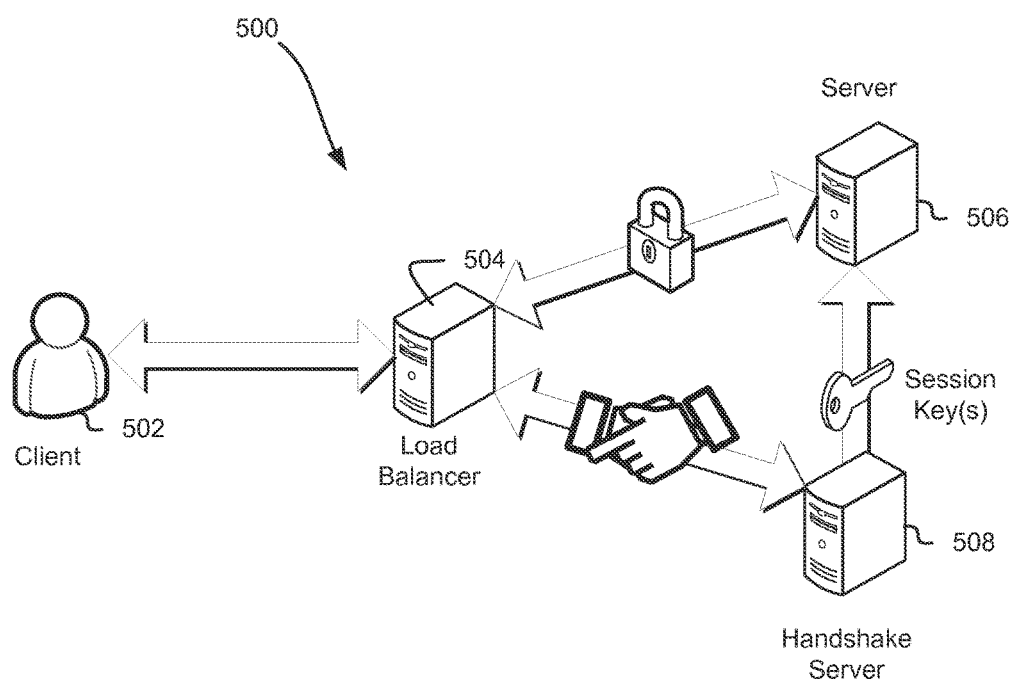
FIG. 5 shows an illustrative example of an environment in which various embodiments can be practiced where the figure illustrates another way of providing a server with a set of session keys in accordance with an embodiment.

FIG. 5 shows an illustrative example of an environment 500 in accordance with an embodiment. Environment 500 may be the environment 400 discussed above in connection with FIG. 4. For example, as illustrated in FIG. 5, the environment 500 includes a client 502, a load balancer 504, a server 506, and a handshake server 508, such as described above in connection with FIG. 4. In this particular example, however, the handshake server 508 and server 506 are able to communicate via a side channel, which is a communications channel that bypasses the load balancer 504. The handshake server 508 and server 506 may have, for instance, a TCP connection between them over a local (private) network of a service provider that operates the server 506 and handshake server 508. The handshake server 508 and server 506 may have a TLS or other cryptographically protected communications session between themselves.

In this example, the client 502 communicates with the handshake server 508 through the load balancer 504, such as described above, to perform a handshake and to negotiate therefore a set of session keys. Through the side channel, the handshake server 508 may provide the server 506 with the set of session keys through the side channel, thereby enabling the server 506 to communicate with the client 502 over a cryptographically protected communications session that was negotiated as a result of a handshake performed by the client 502 with a handshake server 508. A message (or set of messages) from the handshake server 508 to the server 506 may specify a session identifier to enable the server 506 to associate the set of session keys with the session to access the session keys for use upon receipt of messages over the cryptographically protected communications session from the client, and/or to send messages to the client over the cryptographically protected communications session. As another example, both the server 506 and handshake server 508 may have access to a data storage location where the handshake server 508 can store the set of session keys, and from where the server 506 can retrieve the session keys.

As with all communications between various components involved in the various embodiments, communications may be authenticated to, for example, allow the server 506 to operate in a manner that trusts the set of session keys provided by the handshake server 508. To enable the handshake server 508 to provide the server 506 with the set of session keys, the load balancer 504 may specify the server 506 to the handshake server 508. The load balancer, for instance, may indicate an IP address of the server 506 or other identifier of the server 506. In another example, the handshake server 508 is not provided information identifying the server 506, but the handshake server 508 provides the set of session keys to a central repository accessible to the server 506. The repository may store sets of session keys in association with session identifiers to enable servers, such as the server 506, to query the repository to obtain the set of session keys for use in communicating with respective clients.

As noted above, the load balancer 504 may be configured to distinguish between handshake messages and other messages, thereby effectively routing communications between the handshake server 508 and the server 506. While FIGS. 4 and 5 show example environments involving a load balancer, a server, and a handshake server, it should be noted that the particular environments illustrated have been simplified for the purpose of illustration. Environments described herein may include additional devices other than those illustrated in the figure. For example, a load balancer would typically be configured with the ability to route network traffic among a fleet of servers and/or a fleet of handshake servers. In this manner, load balancers may be configured to utilize various techniques described herein in addition to normal load balancing capabilities. Thus, for instance, the load balancer can route handshake messages from the same client in the same handshake to the same handshake server, and similarly may route messages outside of the handshake (e.g., messages that are encrypted) to the correct server 506. Note that, in some instances, messages of a handshake protocol are also considered to be messages of a record protocol. In such instances, it should be understood that, as used herein, messages that are part of the record protocol but not part of the handshake protocol may be referred to as record protocol messages or messages of a record protocol, whereas messages that are part of both the record protocol and handshake protocol may be referred to as handshake messages or messages of a handshake protocol.

Figure 6:
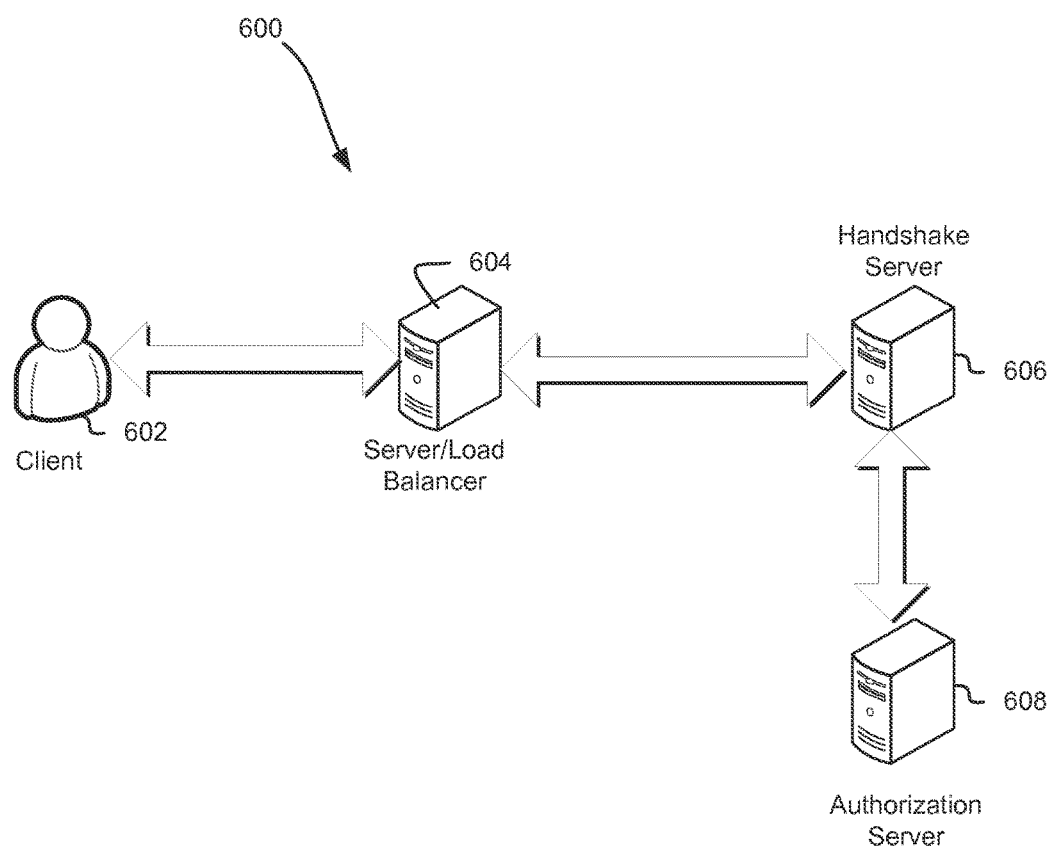
FIG. 6 shows an illustrative example of an environment in which various embodiments can be practiced where a handshake server communicates with an authorization server to determine whether to participate in various handshakes.

FIG. 6 shows another example of an environment 600 in which various embodiments can be practiced. In this particular example, the environment 600 includes a client 602, a server or load balancer 604 such as described above, and handshake server 604. In examples where the server 604 is a load balancer, the environment 600 may include an additional server, such as described above in connection with FIG. 4 or FIG. 5. In the environment of FIG. 6, the environment 600 includes an authorization server 608. The authorization server 608 may be a computer system configured to make authorization decisions for the handshake server 606 to enable the handshake server 606 to determine whether to perform a handshake process when presented with a message initiating a handshake process (e.g., a ClientHello message). The authorization server may be, for instance, a component of an authentication service such as described below, or may be a separate server. In addition, while FIG. 6 shows an example of an authorization server 608 that is separate from the handshake server 606, the capabilities of the authorization server 608 may be built into the handshake server 606. The handshake 606 may include, for example, an authorization module that utilizes information available to it to make authorization decisions, such as whether completion of a handshake would comply with any applicable policy. Such information may include information received from an authentication service such as described below in more detail.

Turning to the specific embodiment illustrated in FIG. 6, the client 602 may communicate with the server/load balancer 604 for the purpose of accessing one or more services. The server/load balancer 604 may proxy messages that are part of a handshake protocol to and from the handshake server 606, such as described above and also in more detail below. While the handshake server 606 receives a message to initiate the handshake process, the handshake server 606 may submit a request to the authorization server 608 and provide the authorization server 608 with information available to the handshake server 606. In one example, for instance, the handshake server 606 has available information about the server/load balancer such as an IP address. The authorization server 608 may check whether the IP address of the server/load balancer 604 appears on a white list of servers authorized to cause the handshake server 606 to participate in handshakes, or may otherwise check whether the server/load balancer 604 has one or more characteristics indicative of authorization to cause the handshake server 606 to perform handshakes. Such characteristics may include, for example, location in a specified subnet, a valid digital signature corresponding to an identity authorized to cause the handshake server to perform handshakes, a geographic location from which the server/load balancer 604 sends messages to the handshake server 606, and/or other information that may be available. Whether or not a server/load balancer 604 is authorized may also be programmatically configurable via API calls to a policy management service such as described below.

A customer of an IaaS as a service provider, for instance, may specify that only computer systems able to provide cryptographic proof of access to certain credentials are authorized to cause the handshake server to perform handshakes. Other examples are also considered as being within the scope of the present disclosure.

As an illustrative example, the handshake server 606 may receive a ClientHello message from the server/load balancer 604. Having received the ClientHello message, the handshake server 606 may generate a request to the authorization server 608 for a determination as to whether to perform a handshake. The authorization server may provide a response that indicates yes or no, and the handshake server may operate accordingly. The handshake server, for example, may submit a message that indicates failure of the handshake to the server/load balancer 604 to be provided to the client 602 in the event that the authorization server 608 provides a negative response to the request from the handshake server 606. Upon a positive response from the authorization server 608, the handshake server 606 may generate and provide a response to the ClientHello message, such as a ServerHello message, in accordance with an SSL/TLS protocol or another message in accordance with other protocol being used.

Note that, in various embodiments, communications between computer systems (e.g., server, load balancer, handshake server) may be encrypted (e.g., over a TLS session), and/or additional information may be provided with various messages. For instance, in some examples, a server or load balancer proxies handshake messages between a client and a handshake server. When proxying such messages, the server or load balancer can include additional information (e.g., a digital signature, contextual information, and/or other information) with the messages being proxied. Such additional information can be combined with the messages and the data can be encrypted, in some examples. In this manner, the handshake server (and, generally, a computer system that receives data from another computer system in addition to messages being proxied) can use the additional information in its operations, such as when determining whether to complete a handshake, how to perform a handshake, and the like.

Figure 7:
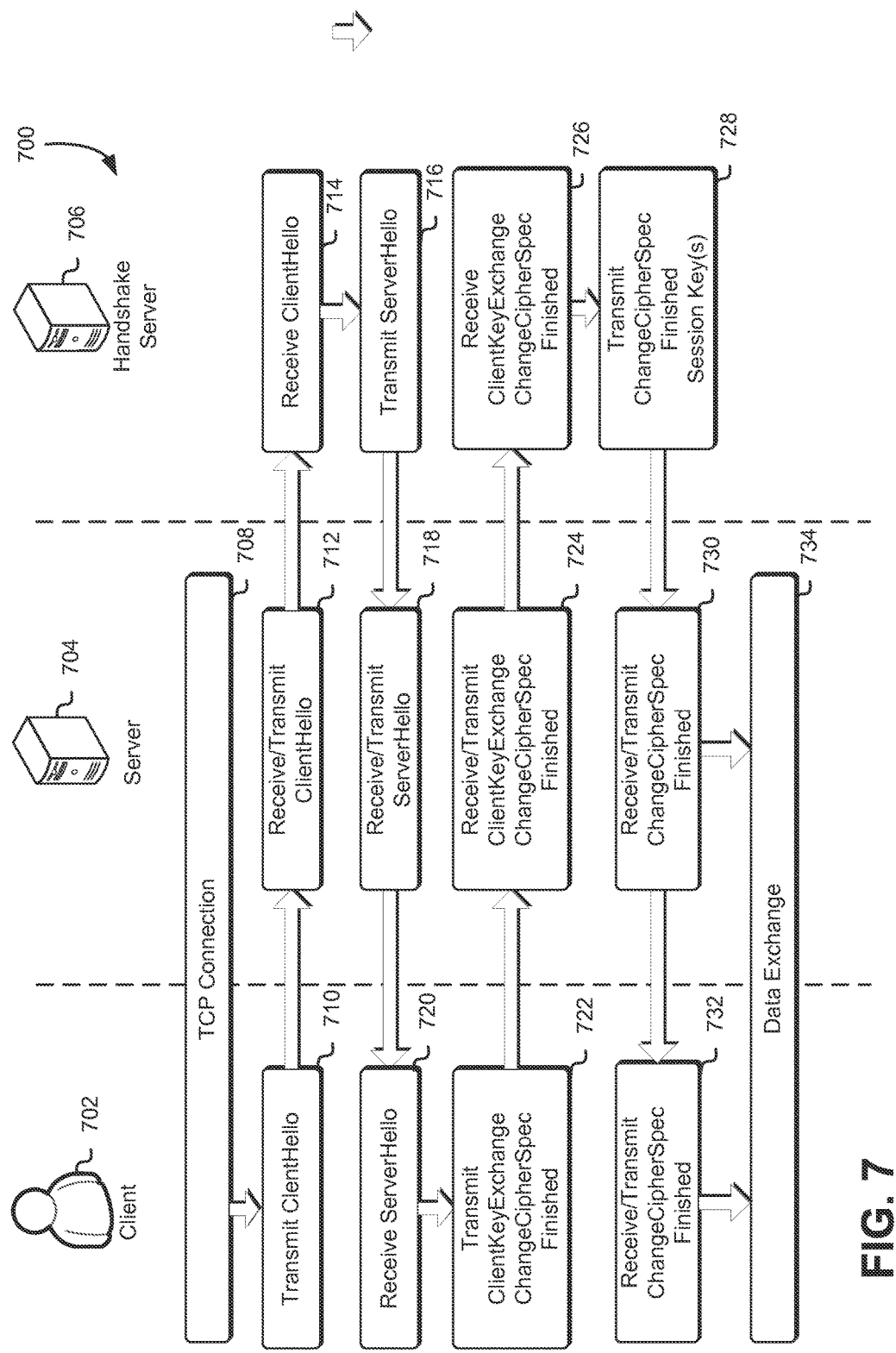
FIG. 7 shows an illustrative example of a diagram showing example communications among a client, a server, and a handshake server in accordance with an embodiment.

FIG. 7 shows a swim diagram 700 illustrating communications between a client 702, a server 704, and a handshake server 706. In an embodiment, the client 702 connects to the server 704, for example, by establishing a TCP connection with the server 704. Once the TCP connection has been established 708, the client may transmit 710 a ClientHello message to the server 704. Note that, while the description of FIG. 7 uses messages of SSL/TLS for illustration, other messages of other protocols may be used. For instance, instead of a ClientHello message, the client 702 could send a different message that initiates a handshake. Turning back to the illustrated example, the server may receive 712 the ClientHello message and, upon detecting that the message is a ClientHello message (or, generally, detect that the message is a handshake message—that is, a message of a handshake protocol), transmit 712 the ClientHello message to the handshake server 706. As noted above, other information may be transmitted with the ClientHello message, and such information may be packaged in a single communication to the handshake server 706.

In the particular embodiment illustrated in FIG. 7, the handshake server 706 receives 714 the ClientHello message and transmits 716 the ServerHello message to the server 704. To transmit 716 the ServerHello message, the handshake server 706 may perform various operations such as by selecting a cipher suite from a set of cipher suites specified in the ClientHello message, where the selected cipher suite is a cipher suite mutually supported by the server 704 and a client 702. Note that, in various embodiments, the handshake server 706 selects a cipher suite not in accordance with what itself supports, but with what the server 704 supports. Thus, the handshake server 706 may be programmed with information that specifies which cipher suites the server 704 supports. In some embodiments, all servers in a fleet are configured to support the same set of cipher suites, although the set of cipher suites supported by different servers in a fleet may vary in some embodiments. Accordingly, this handshake server 706 may have access to information that associates each server in a fleet with a set of cipher suites supported by the server. Such information may be referenced when generating a ServerHello message. In another example, the server includes a set of cipher suites supported by the server with the ClientHello message to enable the handshake server 706 to select a cipher suite that is mutually supported by the client 702 and server 704. For example, the server 704 may create a data package that includes the ClientHello message and other applicable information, such as the set of cipher suites supported by the server 704. The data package may be encrypted, in some examples, although such data packages may be sent in plaintext form in some embodiments.

When the handshake server 706 transmits 716 the ServerHello message to the server 704, the server 704 may receive 718 the ServerHello message and transmit 718 the ServerHello message to the client 720. In this manner, the client 702 receives a ServerHello message in response to the ClientHello message the client 702 transmitted 710 to the server 704. When the client 702 receives 720 the ServerHello message in an embodiment, the client transmits a set of other messages in accordance with a protocol utilized by the client 702 and handshake server 706. In this example, the protocol is an SSL/TLS protocol, and as a result the client 702 transmits 722 a ClientKeyExchange message, a ChangeCipherSpec message, and a Finished message.

Note that while FIG. 7 shows a single box indicating transmission 722 of the different messages, the client 702 may transmit 722 each of the messages separately. The server 704 may receive 724 the ClientKeyExchange message, ChangeCipherSpec message, and the Finished message and transmit 724 each message as it is received. The handshake server 706 may receive 726 the ClientKeyExchange message, the ChangeCipherSpec message, and the Finished message as the messages are transmitted 724 by the server 704. The handshake server 706, to complete the handshake, may transmit 728 a ChangeCipherSpec message, a Finished message, and a set of session keys to the server 704. As with other messages described herein, while FIG. 7 shows transmission 728 of multiple messages in as single block, the messages may be transmitted separately.

As illustrated in FIG. 7, the server 704 receives the transmitted ChangeCipherSpec message, Finished message, and set of session keys and transmits 730 the ChangeCipherSpec message and the Finished message to the client 702. The server 704, however, stores a copy of the set of session keys received 730 from the handshake server 706 and does not forward the set of session keys to the client 702. At this point, the handshake is finished, and the client 702 and server 704 can exchange 734 data over the cryptographically protected communications session that was established by performing the handshake process. In this manner, as illustrated in FIG. 7, the server proxies messages that are part of a handshake protocol while processing other messages, such as messages encrypted over the cryptographically protected communications session and the message with the set of session keys received from the handshake server 706.

Figure 8:
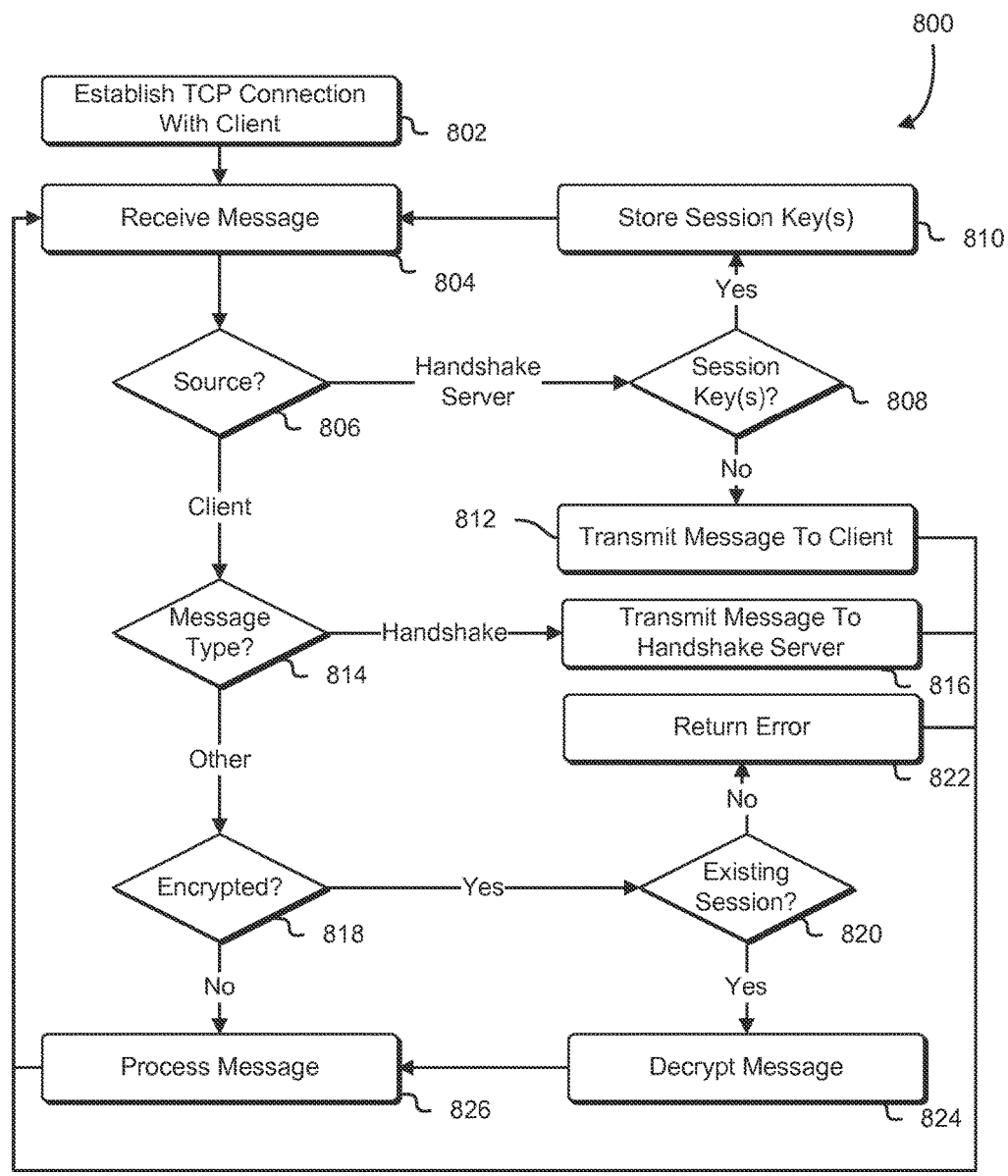
FIG. 8 shows an illustrative example of a process for processing messages in accordance with an embodiment.

FIG. 8 shows an illustrative example of a process 800 for processing messages in accordance with an embodiment. The process 800 may be performed on any suitable computer system, such as a server computer system such as described above. Note that a server computer system may perform the process 800 for multiple clients simultaneously. In an embodiment, the process 800 includes establishing 802 a TCP connection with a client computer system. With the TCP connection established, the process 800 may include receiving 804 a message. The message may be received 804, for example, over the TCP connection that was established 802 with the client. Note, however, that the message may be received over another TCP connection, such as a TCP connection made with a handshake server.

As illustrated in FIG. 8, a system performing the process 800 may operate differently depending on the origin of the message that was received. Accordingly, the process 800 includes determining 806 a source of the message, which in this example is either a client computer system or a handshake server computer system. The source of the message may be determined in various ways in accordance with various embodiments, such as by IP address and/or port number. If the system performing the process 800 determines that the source of the message that was received 804 is the handshake server, the process 800 may include determining 808 whether the message that was received 804 contains a set of session keys. If the system performing the process 800 determines 808 that the message that was received 804 contains a set of session keys, the system may store 810 the set of session keys for use in communicating over a cryptographically protected communications session with the client. Note that other operations may be performed in addition to storing 810 the set of session keys, such as, if applicable, decrypting the set of session keys if the handshake server that transmitted the message encrypted the set of session keys. If the system performing the process 800 determines 808 that the message that it receives 804 does not contain a set of session keys, the system may transmit 812 the message to the client.

Note that FIG. 8 shows an example process where a communication from a handshake server is either a handshake message of a handshake protocol, or includes a set of session keys. In some embodiments, handshake servers may transmit different kinds of messages, and the process 800 may be adopted to handle such messages.

Turning back to the illustrative example shown in FIG. 8, if the system performing the process determines 806 that the source of the message that was received 804 is the client, the process 800 may include determining 804 the type of the message. In an embodiment, the message is of two types, handshake or other. Accordingly, as illustrated in FIG. 8, if the system performing the process 800 determines 814 that the message type is a handshake message type, the system may transmit 816 the message to the handshake server. In this manner, the handshake server can process the message of handshake type to perform a handshake process with the client 802. Note that, with many cryptographically protected communications protocols, handshake messages are transferred in plaintext form. Accordingly, in some embodiments, a system determining a message type (e.g., while performing the process 800 or other processes described herein), the system can parse the message to identify components of the message and match those components to recorded components for different message types. For example, the existence of certain fields can indicate that a message is of a particular type.

If, however, the system performing the process 800 determines 814 that the message that was received 804 is not a handshake message, the system may determine 818 whether the message is encrypted. If the system determines 818 that the message that was received 804 is encrypted, the system may determine 820 whether there is an existing session. If the system determines 820 that there is not an existing session with the client from which the message was received 804, the system may return 822 an error or generally perform error handling. In some examples, the system transmits a message to the client indicating that there was an error and that the system could not process the message from the client. Other variations are also considered as being within the scope of the present disclosure.

If, however, the system determines 820 that there is an existing session, the system may access an appropriate cryptographic key from memory and decrypt 824 the message. If the system performing the process 800 either determines 818 that the message is not encrypted or decrypts 824 the message, the system may then process 826 message. For example, if the message encodes a request, the system may fulfill or otherwise cause to be fulfilled the request. Other operations may include determining whether the request is authentic and/or determining whether fulfillment of the request is authorized in accordance with any applicable policies.

Generally, the way by which a message is processed may vary in accordance with various embodiments and in the various content in which techniques of the present disclosure can be employed. Note that when the system performing the process 800 reaches an ending operating of a flow of logic, such as when the system stores 810 a session key, transmits 812 a message to the client, transmits 816 a message to the handshake server, returns 822 an error, or processes 826 a message, the process 800 may repeat as illustrated in FIG. 8 as additional messages are received 804. Thus, handshake messages received from the client are proxied to the handshake server, and messages from the handshake server that do not contain session keys are proxied to the client. Other messages, however, are processed accordingly without utilizing the handshake server.

Note that the process 800 is simplified and additional operations may be performed. For example, there may be multiple message types, and there may be a separate programming logic for each message type that is used. Also, additional operations, such as storing and referencing information that indicates associations between client computer systems and handshake servers, may also be performed. For example, when a server or other computer system receives a handshake message from a client, the server or other computer system can look up whether there is a handshake server associated with the client. The server or other computer system may select the handshake server if an association has not been made and store the association resulting from the selection such that future handshake messages from the client can be transmitted to the same handshake server. Note that in some examples, handshake servers are load balanced, and such an association may be stored upon receipt of a first message from a handshake server. Thus, when the server or other computer system receives a message from a handshake server, if an association is not already recorded, the server or other computer system can record the association. Other variations and additional operations are also considered as being within the scope of the present disclosure if and when not explicitly stated herein.

Figure 9:
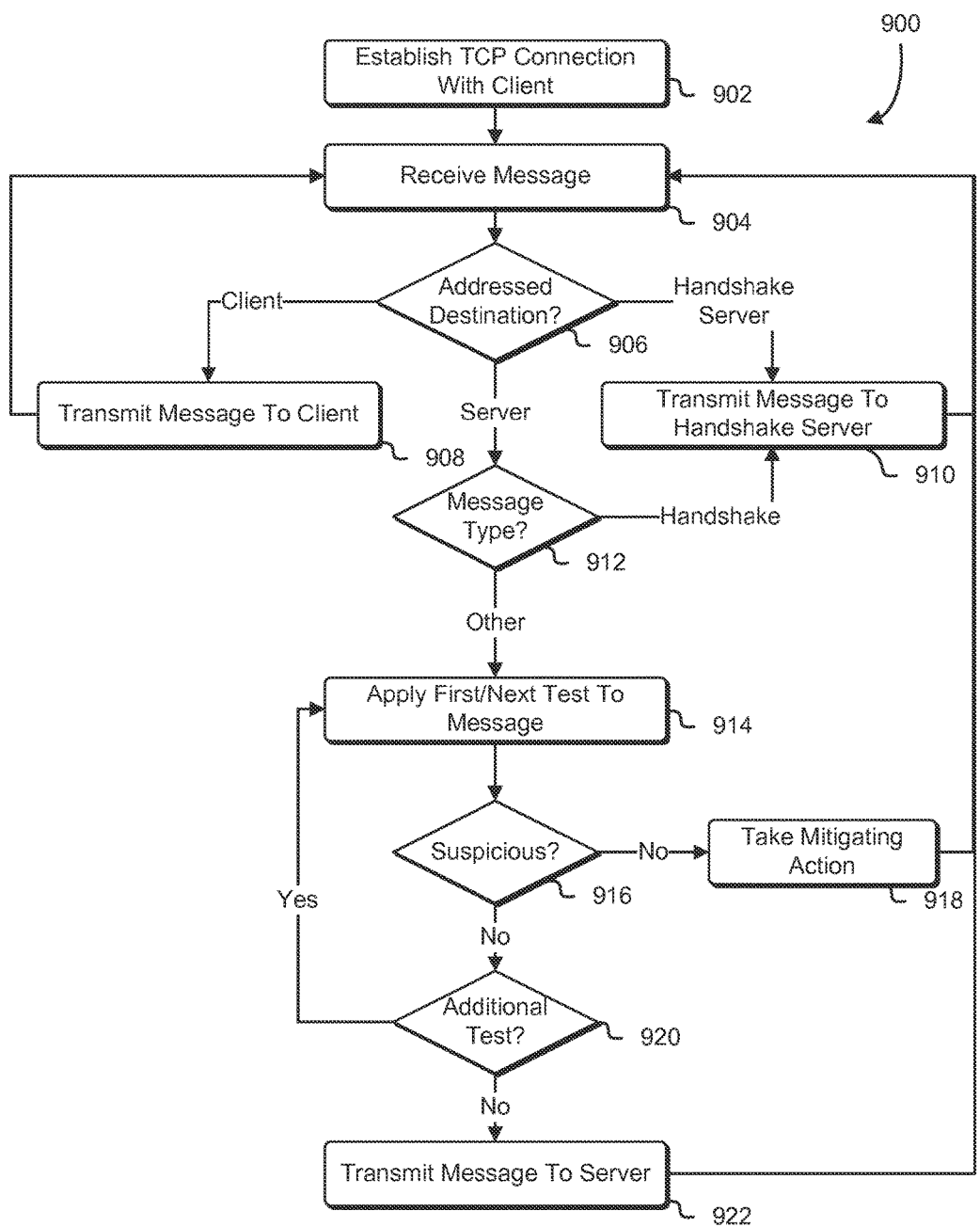
FIG. 9 shows an illustrative example of a process for load balancing in accordance with an embodiment.

FIG. 9 shows an illustrative example of a process 900 for load balancing in accordance with an embodiment. The process may be performed by any suitable computer system, such as a load balancer computer system such as described above. In an embodiment, the process 900 includes establishing 902 a TCP connection with a client. Having established 902 the TCP connection, the system performing the process 900 may include receiving 904 a message. In this particular example, the message may be to a client, to a server, or to a handshake server where the client server and handshake server may be such as described above. Note that while not illustrated in FIG. 9, the process 900 may include logic for handling messages not addressed to the client server or handshake server.

Turning to the illustrative example of FIG. 9, when the message is received 904, the system performing the process 900 determines 906 the destination to which the message that was received 904 is addressed. If the system determines 906 that the message is addressed to the client, the message may then be transmitted 908 to the client. Similarly, if the system performing the process 900 determines 906 that the message was received 904 is addressed to the handshake server, the process 900 may include transmitting 910 the message to the handshake server. Note, however, that in some embodiments, messages through the load balancer performing the process 900 may not be addressable to the handshake server and, as a result, other operations may be performed when messages that are received 904 are addressed to the handshake server.

Returning to the example illustrated in FIG. 9, if the system performing the process 900 determines 906 that the message that was received 904 was addressed to the server, the system performing the process 900 may determine whether to provide the message to the server or to provide the message to the handshake server. Accordingly, in this example, the process 900 includes determining 912 a message type of the message that was received 904. In this particular example, there are two possible messages types: handshake message type and other message types (that is, messages that are not handshake messages). Although, as noted above, variations of the process 900 considered as being within the scope of the present disclosure include those where there is different programming logic for other types of messages not illustrated in the figure.

Accordingly, if the system determines 912 that the message type is a handshake message type, the process 900 may include transmitting 910 a message to the handshake server. If, however, the system determines 912 that the message type is not a handshake message type, the system performing the process 900 may apply a set of tests to the message to determine whether the message is suspicious. For example, in some embodiments, non-handshake messages are required to be encrypted. In other words, in some examples, all communications other than handshake messages are required to be over a cryptographically protected communications session. Accordingly, a message that is not a handshake message that is received and that is not encrypted may be suspicious. Accordingly, as illustrated in FIG. 9, the process 900 includes applying 914 a first or next test to the message. The test may be one of multiple tests applied to the message to determine whether the message contains suspicious data. In one example, a test includes analyzing a sequence of bytes to determine whether the same bit in each of the bytes is either a zero or a one. For example, the test may include determining whether there is a sequence of bytes of a particular length (e.g., 64), where each byte starts with a zero or a one, or where the second bit in each byte is consistently a zero or consistently a one, whether the third bit in every byte is consistently a zero or consistently a one (and so on). Such a test may catch American Standard Code for Information Interchange (ASCII) text, central processing unit (CPU) operations, and other data where bytes or other units of data have a consistent value (or set of values) for a subset of the bits.

Another test may include determining whether the message contains a sequence of bits that is unlikely to occur in encrypted data. An example of such sequence is a sequence of N bits that are all zero or all one, where N is a positive integer selected such that the probability of a false positive (i.e., of encrypted data having the sequence) is below a threshold (e.g., $\frac{1}{2}^{64}$). Such a test may catch a memory dump where unallocated memory may have zero values. As yet another example, the message may be analyzed for data appearing on a blacklist of data that is unlikely to appear in a set of encrypted bits. Other tests may also be performed. Generally, the tests may be configured and applied such that the tests define a set of conditions on data that, when met, indicate that the data is potentially malicious.

After applying the first/next test message, the system may utilize output of the test to determine 916 whether the message is suspicious. If determined 916 the message is suspicious, the process 900 may include taking 918 a mitigating action, which may include performing one or more operations configured to enhance security. As an example, the system performing the process 900 may disconnect the TCP connection that was made. As another example, one or more notifications may be generated and transmitted. As yet another example, one or more events may be logged. Generally, any action configured to increase security is considered as being within the scope of the present disclosure, as well as other actions triggered upon detection of a suspicious message.

If determined 916 that the message is not suspicious, the process 900 may include determining 920 whether there is an additional test to perform. Tests may be applied to the message repeatedly until it is either determined 916 that the message is suspicious or it is determined 920 that there are no additional tests to perform. When determined 920 that there are no additional tests to perform, the process 900 may include transmitting 922 the message to the server.

As with all processes described herein, variations are considered as being within the scope of the present disclosure. For example, FIG. 9 shows a process where tests are applied in sequence to a message where any given test may indicate whether the message is suspicious in accordance with that test. Note, however, that tests may be performed in a different order or in parallel. In some examples, for instance, multiple tests are applied, and output of multiple tests is used to generate a confidence score relating to whether the message is suspicious. The score may be, for example, a sum of tests that indicate the message as being suspicious.

Note also that FIG. 9 shows a process whereby messages are analyzed in real time to determine whether the messages are suspicious as indicating one or more characteristics associated with being potentially malicious. However, messages may be analyzed asymmetrically relative to performance of the process 900. For example, messages may be simply transmitted 922 to the server, and the messages themselves may be analyzed asynchronously. Messages may be, for example, be placed into a queue or log to be processed as resources are available. If such a asynchronous processing results in detection of a suspicious message, mitigating action may be taken 918 such as described above. In this manner, while reaction time to potentially malicious messages is slower, processing and other resources can be more evenly managed to allow efficient communication unhindered by analysis of the messages.

As yet another example, FIG. 9 shows applying a set of tests to messages addressed to the server. The process 900 can be adapted to apply tests to messages to the client (e.g., to catch memory dumps of the server) and/or messages to/from the handshake server. In this manner, system compromise can be more easily detected and identified.

Figure 10:
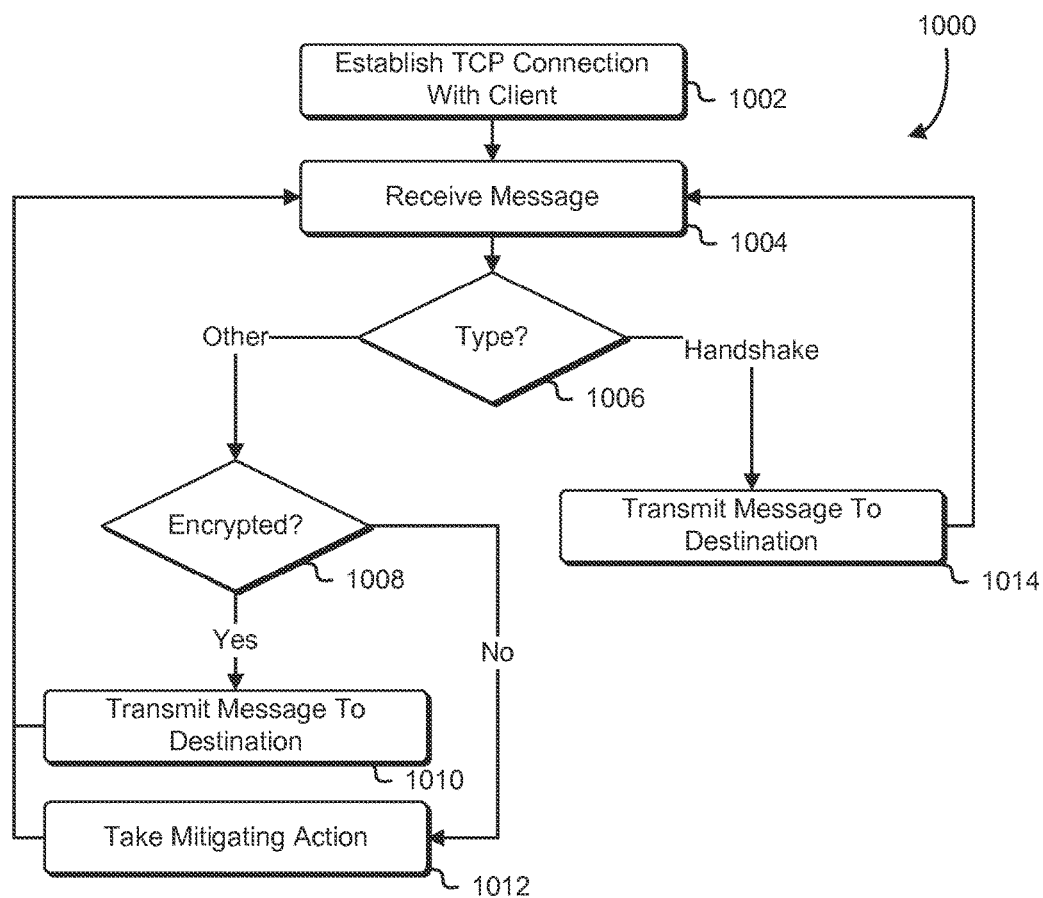
FIG. 10 shows another example of a process for load balancing in accordance with an embodiment.

Other variations are also considered as being within the scope of the present disclosure. However, techniques of the present disclosure apply to load balancing systems regardless of whether such systems involve a handshake server. FIG. 10, accordingly, shows an illustrative example of a process 1000 that may be used by a load balancer or other computer system to be able to distinguish between the various phases of a protocol for establishing cryptographically protected communication sessions, such as SSL/TLS. The process 1000 may be performed by any suitable system, such as a load balance or computer system such as described above.

In an embodiment, the process 1000 includes establishing 1002 a TCP connection with a client. A message may be received 1004 such as described above. Note that as with other processes described above, the message may be received 1004 over the TCP connection that was established 1002, or over another connection. When a message is received 1004, the system performing the process 1000 may determine 1006 a type for the message. In this example, a message is either a handshake message or another type of message, although as with other processes described herein, other types of messages may be processed in different ways in accordance with various embodiments. In this particular example, if it is determined 1006 that the message is not a handshake message, the process 1000 may include determining 1008 whether the message is encrypted. Determining 1008 whether the message is encrypted may be performed such as by applying a set of tests such as described above. If it is determined 1008 that the message is encrypted, the process 1000 may include transmitting 1010 the message to its destination.

If, however, it is determined 1008 that the message that was received 1004 is not encrypted, the process 1000 may include taking 1012 mitigating action such as described above. If, however, the system performing the process 1000 determine 1006 that the message that was received 1004 is a handshake message, the process 1000 may include transmitting 1014 the message to its destination. Note that the process 1000 illustrates an example where a client and server are restricted to communicating over cryptographically protected communications sessions. In this manner, as illustrated in FIG. 10, if a client or a server transmits a message to the other that is not a handshake and otherwise not in accordance with the protocol to which the client and server are restricted, mitigating action may be taken. Note, however, that variations to the process 1000 are considered as being within the scope of the present disclosure. For example, in some implementations, the way by which a message is processed may depend on whether the message is from the server to the client or from the client to the server. For example, attacks on server provider systems may be more often performed using client computing devices, and determining whether the message encrypted may be performed only for messages received from the client to the server. Messages from the client, however, may be analyzed for more scrutiny.

Although more scrutiny may be applied to messages from the client to the server, note that the destination for messages of handshake type may be a server in embodiments in which the server performs the handshake with the client, or the destination may be a handshake server such as described above. Note that other variations of the process 1000 include those in which the system performing this process 1000 allows different types of messages to pass back and forth, but tracks whether a cryptographically protected communications session has been established. If a cryptographically protected communications session has been established, more scrutiny may be applied to messages that are received where the messages are not part of the handshake protocol. Thus, clients can communicate with servers over plaintext. However, if the client expresses a desire for confidentiality by establishing a cryptographically protected communication session, the client may be expected to utilize the cryptographically protected communications sessions. Messages that are received that are outside of that cryptographically protected communications session may trigger more scrutiny, such as described above. Other variations may also be incorporated into the process 1000 and its variations.

Figure 11:
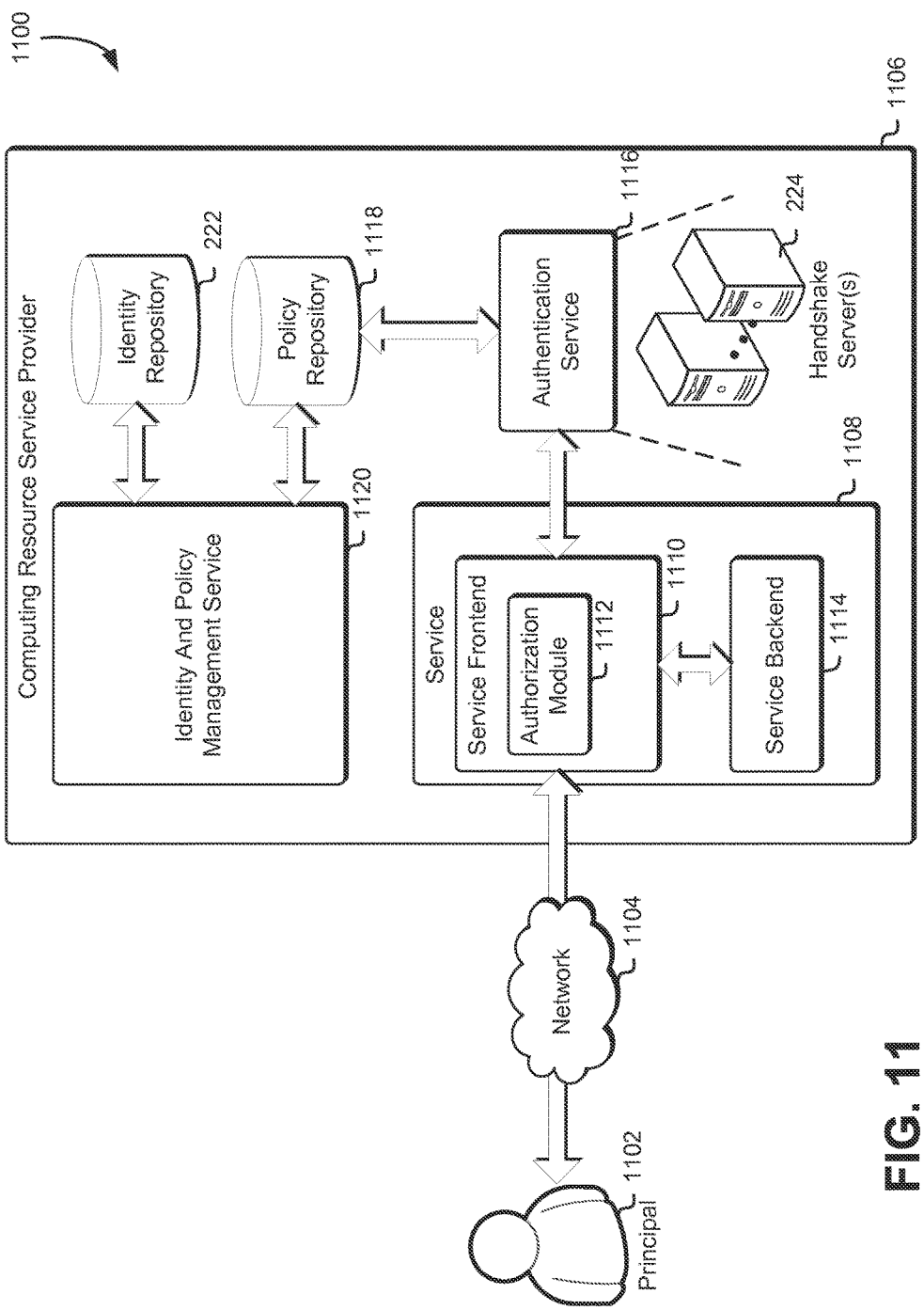
FIG. 11 shows an illustrative example of an environment in which embodiments can be practiced.

FIG. 11 is an illustrative example of an environment 1100 in which a distributed computer system may utilize the various techniques described herein. In an embodiment, a principal 1102 may use a computing device (e.g., the client 102 described above in connection with FIG. 1) to communicate over a network 1104 with a computing resource service provider 1106. Communications between the computing resource service provider 1106 and the principal 1102 may, for instance, be for the purpose of accessing a service 1108 operated by the computing resource service provider 1106, which may be one of many services operated by the computing resource service provider 1106. For example, the service provider 1106 may use the service 1108 to operate a virtual computer system service where customers can programmatically (through an API) manage virtual computer systems hosted on hardware of the service provider 1106. As another example, the service provider may use the service 1108 to operate a certificate authority service that vends digital certificates (e.g., website digital certificates) as a service. The service provider 1106 may operate both such services and the certificate authority service may vend digital certificates to virtual computer systems hosted by the virtual computer system service, which may be used to operate web servers, other servers (e.g., application servers) and/or handshake servers. The service 1108 may also be used to operate a website of the service provider 1106 that allows for the management of computing resources of other services operated by the service provider 1106 and/or for other services offered by the service provider 1108, depending on the type of services offered by the service provider.

The service 1108 may comprise a service frontend 1110 and a service backend 1114. The principal 1102 may, through an associated computing device, establish a cryptographically protected communications session (e.g., an SSL/TLS session) and issue a request for access to a service 1108 (and/or a request for access to resources associated with the service 1108) provided by a computing resource service provider 1106. The request for access may be, for instance, a request to access a resource and/or a request to authenticate. The request may be, for instance, a web service application programming interface request (referred to more succinctly as a web service request). The principal may be a user, a group of users, a role associated with a group of users, or a process representing one or more of these entities that may be running on one or more remote (relative to the computing resource service provider 1106) computer systems, or may be some other such computer system entity, user, or process such as the client 102 described above in connection with FIG. 1. Each user, group, role, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider, where the computing resource service provider manages permissions for the identity, and where the entity may include one or more sub-entities, which themselves may have identities.

The principal 1102 may communicate with the computing resource service provider 1106 via one or more connections (e.g., transmission control protocol (TCP) connections) over a cryptographically protected communications session established using various techniques described herein. The principal 1102 may use a computing device (also referred to as a client computing device or simply "client device") to connect to the computing resource service provider 1106. The client device may include any device that is capable of connecting with a computer system via a network, such as example devices discussed below. The network 1104 may include, for example, the Internet or another network or combination of networks discussed below.

The computing resource service provider 1106, through the service 1108, may provide access to one or more computing resources such as virtual machine (VM) instances or automatic scaling groups for computing resources (e.g., VM instances, file-based database storage systems, block storage services, redundant data storage services, data archive services, data warehousing services, user access management services, identity and/or policy management services, content management services, and/or other such computer system services). Other example resources include, but are not limited to, user resources, policy resources, network resources, public cryptographic keys, private cryptographic keys, symmetric cryptographic keys, and/or storage resources. In some examples, the resources associated with the computer services may be physical devices, virtual devices, combinations of physical and/or virtual devices, or other such device embodiments. Note that, in some embodiments, the principal 1102 connects to a server of the service 1108 to access one or more services of the service provider. In other embodiments, the principal 1102 connects to a server (e.g., a virtual machine instance) hosted by the service provider, where the server is managed by another entity (e.g., a customer of the service provider).

In some embodiments, a request for access to the service 1108 is received by a service frontend 1110, which, in some examples, comprises a web server configured to receive such requests and to process them according to one or more policies associated with the service 1108. The request for access to the service 1108 may be a digitally signed request and, as a result, may be provided with a digital signature. In some embodiments, the web server employs techniques described herein synchronously with processing the requests. The service frontend 1110 may then send the request and the digital signature for verification to an authentication service 1116. The authentication service 1116 may be a stand-alone service or may be part of a service provider or other entity. The authentication service 1116, in an embodiment, is a computer system configured to perform operations involved in authentication of principals. In some examples, requests submitted to the service frontend 1110 are digitally signed by the principal (i.e., by a computing device used by or operating on behalf of the principal) using a symmetric cryptographic key that is shared between the principal 1102 and the authentication service 1116. The authentication service, therefore, may use a copy of the symmetric cryptographic key to verify digital signatures of requests purported to have been generated by the principal 1102. The authentication service, in some embodiments, can also operate on information that is not digitally signed, such as a ClientHello message received by the frontend 1110 to initiate a handshake to establish a cryptographically protected communications session.

In some embodiments, the authentication service comprises a fleet of handshake servers 1124 such as described above. Servers and/or load balancers in the frontend (either that support the service or that are offered as a service) can proxy handshake messages between handshake servers and principals. Thus, when the frontend 1110 receives a ClientHello or other handshake message, the frontend 1110 can proxy the message to a handshake server of the fleet of handshake servers. Note, however, that while FIG. 11 shows a fleet of handshake servers 1124 that are part of the authentication service, the fleet of handshake servers can be operated outside of the authentication service 1116, such as in a separate service.

In some embodiments, the authentication service 1116 is configured to utilize asymmetric cryptography for digital signature verification such as, for example, when the principal digitally signs requests using a private cryptographic key. In such embodiments, the authentication service may be configured to trust a certificate authority that digitally signed a certificate of the principal 1102 corresponding to the private cryptographic key. Consequently, in some embodiments, the authentication service may use a public cryptographic key specified by the certificate.

Upon successful authentication of a request or at another time (e.g., when operating on a ClientHello message), the authentication service 1116 may then obtain policies applicable to the request or message. A policy may be applicable to the request or message by way of being associated with the principal 1102, a resource to be accessed as part of fulfillment of the request, a group in which the principal 1102 is a member, a role the principal 1102 has assumed, an IP address from which a message was received, and/or otherwise. To obtain policies applicable to the request or message, the authentication service 1116 may transmit a query to a policy repository 1118 managed by an identity and policy management service 1120.

The identity and policy management service 1120 may be a service accessible via API to customers of the service provider 1106 for the purpose of managing policies on computing resources and managing identities associated with customer accounts. Identities may be assigned for various purposes, such as users, roles, groups, computer systems, and the like. In some embodiments, API calls to the identity and policy management service 1120 may specify conditions for when a handshake can be performed or, alternatively, conditions stating when a handshake cannot (e.g., is not authorized to) be performed. The conditions may be used, for instance, by a server to determine whether to proxy handshake messages to a handshake server. The conditions may also be used by a handshake server to determine whether to complete a handshake for messages forwarded to the handshake server. In this latter case, the conditions may state which servers are authorized to proxy handshake messages to the handshake servers. In this manner, policy management can be used to enhance security by allowing only handshake servers the ability to perform handshakes when authorized.

The query to the policy repository 1118 from the authentication service 1116 may be a request comprising information sufficient to determine a set of policies applicable to the request or message. The query to the policy repository may, for instance, contain a copy of the request, message, and/or contain parameters based at least in part on information in the request, such as information identifying the principal, the resource, and/or an action (operation to be performed as part of fulfillment of the request).

Having obtained any policies applicable to the request or message, the authentication service 1116 may provide an authentication response and, if applicable, the obtained policies back to the service frontend 1110 or other entity (e.g., handshake server) that submitted the query. The service frontend 1110 may then check whether the fulfillment of the request for access to the service 1108 would comply with the obtained policies using an authorization module 1112. An authorization module 1112 may be a process executing on the service frontend or other entity that is operable to compare the request to the one or more permissions in the policy to determine whether service may satisfy the request (i.e., whether fulfillment of the request is authorized) in accordance with policy. For example, the authorization module may compare an API call associated with the request against permitted API calls specified by the policy to determine if the request is allowed. If the authorization module 1112 is not able to match the request to a permission specified by the policy, the authorization module 1112 may execute one or more default actions such as, for example, providing a message to the service frontend that causes the service frontend to deny the request or end a TCP connection, and causing the denied request to be logged into the identity and policy management service 1120. If the authorization matches the request to one or more permissions specified by the policy, the authorization module 1112 may inform the service frontend whether the fulfillment of the request is authorized (i.e., complies with applicable policy) based on that selected response. Note that, while FIG. 11 shows the authorization module 1112 as a component of the service frontend 1110, in some embodiments, the authorization module 1112 is a separate service provided by the computing resource service provider 1106, and the frontend service may communicate with the authorization module 1112 over a network.

The authorization module 1112 may also be used to make determinations as to whether to perform handshakes and/or to select a handshake server to perform a handshake. In such examples, when the frontend receives a ClientHello message, the frontend may use data it has available to it (e.g., IP address, time of day, geolocation of client device) to make a call to the authentication service for any applicable policy relating to whether the handshake should be performed. The authorization module 1112 may then determine whether policy allows proxying of messages to a handshake server. If determined that proxying is not allowed by applicable policy, the authorization module can information the fronted and the frontend could simply not respond to client communications, disconnect a TCP action, transmit a notification, and/or take another mitigating action.

Finally, if the fulfillment of the request for access to the service 1108 complies with the applicable obtained policies, the service frontend 1110 may fulfill the request using the service backend 1114. A service backend 1114 may be a component of the service (e.g., comprising one or more application servers, data storage servers, database servers, and/or other devices) configured to receive authorized requests from the service frontend 1110 and configured to fulfill such requests. The service frontend 1110 may, for instance, submit a request to the service backend to cause the service backend 1114 to perform one or more operations involved in fulfilling the request. In some examples, the service backend 1114 provides data back to the service frontend 1110 so that the service frontend provides in response to the request from the principal 1102. In some embodiments, a response to the principal 1102 may be provided from the service frontend 1110 indicating whether the request was allowed or denied and, if allowed, one or more results of the request. Note that, in some embodiments, a fleet of handshake servers is located in the service backend 1114 and, if policy allows completion of a handshake, in some embodiments, the handshake messages are proxied between a client and a handshake server of the service backend 1114.

Further, as noted above, if fulfillment of the request for access to the service 1108 complies with the applicable obtained policies, the service frontend 1110 may generate and submit one or more requests to one or more other services of the computing resource service provider 1106 to cause the one or more other services to perform one or more requested operations on behalf of the principal 1102.

As illustrated in FIG. 11, the identity and policy management service has an identity repository 1122 that may be a data storage system used to store identities of customers of the service provider 1106 in association with respective data, such as information about the identities, groups identities belong to, demographic information, and/or other information. In some examples, customers, through API calls to the identity and policy management service (which may be configured similarly to the service 1108 with a respective frontend and backend), to manage (e.g., add, delete, change) identities associated with their respective accounts with the service provider 1106.

In some examples, a customer may utilize API calls to the identity and policy management service 1120 to associate public cryptographic keys with respective identities to enable those identities to use their respective cryptographic keys to access various services of the computing resource service provider 1106. In some examples, an API call to associate a public cryptographic key with an identity allows for assignment of a key identifier (which may be a fingerprint of a digital certificate that encodes the public cryptographic key or another identifier, such as a sequence number or random number) through the API call or automatically as part of fulfillment of the API call. Use of an identifier that is different from a fingerprint (i.e., a public value) allows for less frequent denial of service attacks by attaching the fingerprint to other identities, thereby preventing use of the public key. In some examples, a customer can assign different identifiers to the same public cryptographic key, e.g., to enable identities to utilize the same smart card or other device with the corresponding private cryptographic key to utilize the device in multiple contexts and to enable independent management of applicable policy in different contexts (e.g., in different test accounts for different development environments). For example, API calls to the identity and policy management service 1120 may be used to specify public keys that are to be trusted so that, when a client authenticates using a private key (e.g., as part of a handshake process utilizing client authentication), such authentication, verified using a public key managed through the identity and policy management service 1120, can be used to determine whether to complete a handshake. For example, policy applicable to a handshake may be identified based at least in part on an identifier of a public key specified by a client during a handshake process and, contingent on determining that policy allows the handshake to complete, the frontend or other entity may operate accordingly and utilize various techniques described herein.

Figure 12:
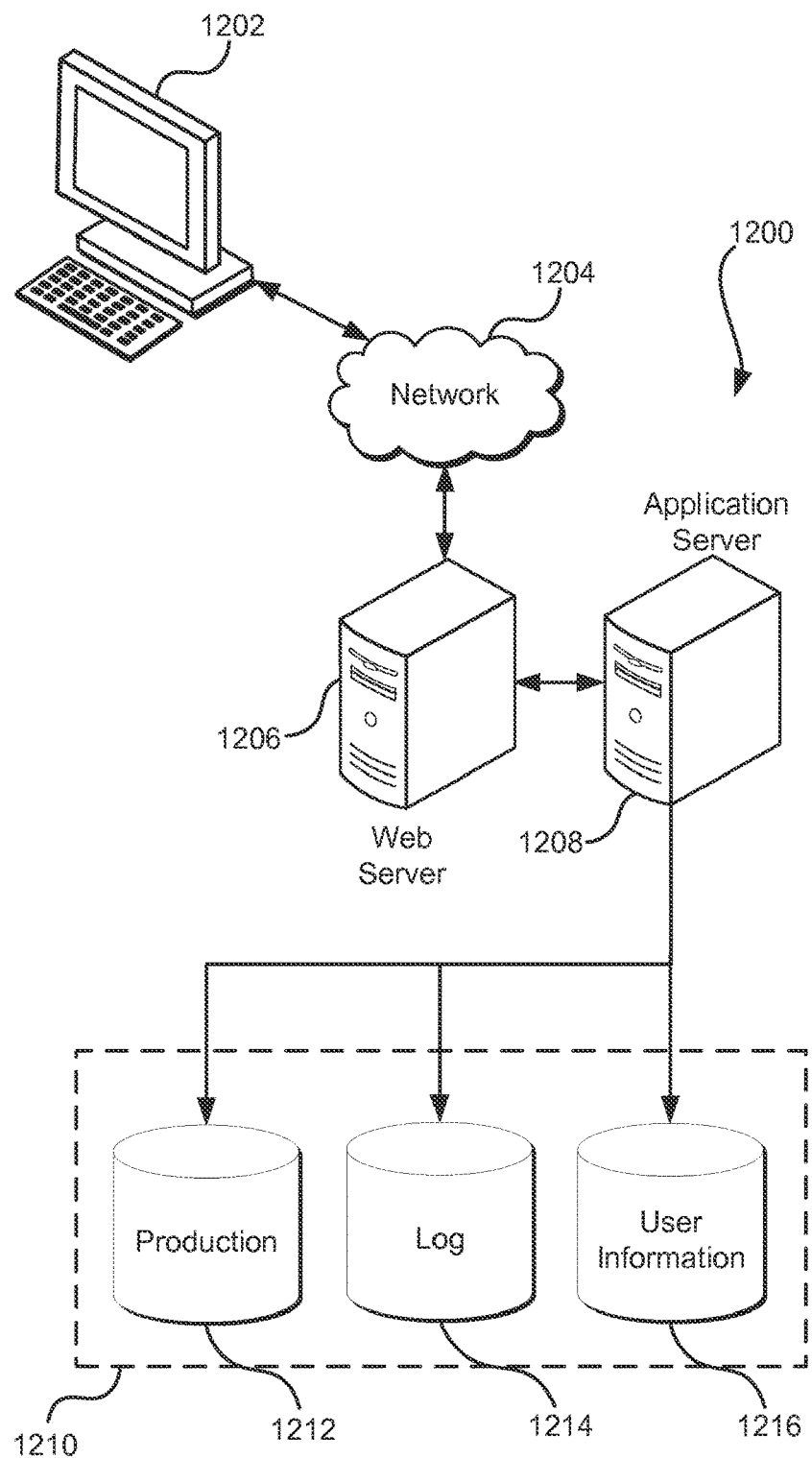
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    establishing, by a load balancer, a network connection with a client computer system;
    determining, by the load balancer and based at least in part on data associated with a first set of messages of a handshake protocol of a cryptographically protected communications protocol, a handshake server from a plurality of handshake servers;
    proxying, by the load balancer, over a first cryptographically protected communications session with the handshake server that uses a first symmetric cryptographic key, the first set of messages between the client computer system and the handshake server thereby facilitating negotiation of a second symmetric cryptographic key for a second cryptographically protected communications session using an asymmetric key pair comprising a private cryptographic key accessible to the handshake server;

obtaining, by a server computer system, the second symmetric cryptographic key from the handshake server;

for a second set of messages outside of the handshake protocol of the cryptographically protected communications protocol, using at least the second symmetric cryptographic key to cryptographically process the second set of messages; and as a result of the cryptographically protected communications session having been established, determine whether a message between the client computer system and the server computer system includes data not encrypted in accordance with the cryptographically protected communications session; and as a result of the message from the client computer system includes data not encrypted in accordance with the cryptographically protected communications session, take a mitigating action.

2. The computer-implemented method of claim 1, wherein each message of the first set of messages is addressed to the handshake server.

3. The computer-implemented method of claim 1, wherein the cryptographically protected communications protocol is a Secure Sockets Layer/Transport Layer Security protocol or Internet Protocol Security.

4. The computer-implemented method of claim 1, wherein the server computer system and the handshake server are implemented on separate physical computing devices.

5. A system, comprising:
one or more processors; and
memory storing instructions that, as a result of being executed by the one or more processors, cause the system to:
  receive, by a load balancer, a message from a client computer system;
  determine, by a load balancer, whether the message is for a handshake based at least in part on data associated with the message;
  if the message is for a handshake, provide the message to another computer system of a plurality of computer systems to perform the handshake and enable the other computer system to negotiate, with the client computer system, a cryptographically protected communications session;
  obtain, by a server, a cryptographic key from the other computer system; and
  use the cryptographic key to communicate to the client computer system over the cryptographically protected communications session; and
  as a result of the cryptographically protected communications session having been established, determine whether a message between the client computer system and the server includes data not encrypted in accordance with the cryptographically protected communications session; and
  if determined that the message from the client computer system includes data not encrypted in accordance with the cryptographically protected communications session, take a mitigating action.

6. The system of claim 5, wherein the cryptographically protected communications session is a Sockets Layer Security or Transport Layer Security session.

7. The system of claim 5, wherein the instructions further include instructions that, as a result of being executed by the one or more processors, cause the system to:
  if the message is not a handshake message, perform a set of tests on the message to determine whether the message comprises potentially malicious data; and
  perform a mitigating action if determined that the message comprises potentially malicious data.

8. The system of claim 5, wherein the instructions that cause the system uses the cryptographic key to communicate to the client computer system, as a result of being executed by the one or more processors, cause the system to encrypt data using the cryptographic key.

9. The system of claim 5, wherein the system comprises the other computer system.

10. The system of claim 9, wherein the other computer system is configured to apply a policy to determine whether to perform the handshake.

11. The system of claim 5, wherein the handshake involves use of a private cryptographic key to which the system lacks access.

12. The system of claim 5, wherein the instructions further comprise instructions that, as a result of being executed by the one or more processors cause the system to:
  receive a third message from the other computer system, the third message being part of the handshake; and
  provide the third message to the client computer system.

13. The system of claim 5, wherein:
  the system comprises the other computer system; and
  the other computer system is inaccessible via any public Internet Protocol address.

14. A non-transitory computer-readable storage medium having stored thereon executable instructions that, as a result of being executed by one or more processors of a first computer system, cause the first computer system to at least:
  determine, by a load balancer, a second computer system from a plurality of computer systems based at least in part on data associated with handshake messages;
  proxy, by a load balancer, handshake messages of a protocol for cryptographically protected communications sessions between a client computer system and the second computer system;
  obtain, by a server, a set of cryptographic keys for a cryptographically protected communications session from the second computer system; and
  use the set of cryptographic keys to communicate with the client computer system over the cryptographically protected communications session; and
  as a result of the cryptographically protected communications session having been established, determine whether a message from the client computer system includes data not encrypted in accordance with the cryptographically protected communications session; and
  if determined that the message from the client computer system includes data not encrypted in accordance with the cryptographically protected communications session, take a mitigating action.

15. The non-transitory computer-readable storage medium of claim 14, wherein:
  the cryptographically protected communications session utilizes encryption.

16. The non-transitory computer-readable storage medium of claim 14, wherein:
  the first computer system is a web server of a web site having a corresponding digital certificate with a corresponding private cryptographic key; and the first computer system lacks access to the corresponding private cryptographic key.

17. The non-transitory computer-readable storage medium of claim 14, wherein the cryptographically protected communications session is a transport layer security session.

18. The non-transitory computer-readable storage medium of claim 14, wherein the executable instructions that cause the first computer system to proxy the message between the client computer system and the second computer system, as a result of being executed by the one or more processors, cause the first computer system to digitally sign message to the second computer system to enable the second computer system to authenticate the message.

19. The non-transitory computer-readable storage medium of claim 14, wherein the set of cryptographic keys comprises an encryption key, a decryption key, and two data integrity keys.

20. The non-transitory computer-readable storage medium of claim 14, wherein the executable instructions further comprise instructions that, as a result of being executed by the one or more processors, cause the first computer system to:
  determine one or more characteristics of the client computer system; and
  select, based at least in part on the one or more characteristics of the client computer system, the second computer system from a plurality of computer systems configured to perform handshakes.

21. The non-transitory computer-readable storage medium of claim 14, wherein:
  the executable instructions further comprise instructions that, as a result of being executed by the one or more processors, cause the system to:
   determine one or more characteristics of the client computer system; and
   apply a policy to the one or more characteristics to determine whether to proxy the handshake messages.

22. The computer-implemented method of claim 1, wherein data associated with the first set of messages include at least one of: internet protocol (IP) address, time of day, and geolocation of the client computer system.

23. The system of claim 5, wherein data associated with the message include at least one of: internet protocol (IP) address, time of day, and geolocation of the client computer system.

24. The non-transitory computer-readable storage medium of claim 14, wherein data associated with the handshake messages include at least one of: internet protocol (IP) address, time of day, and geolocation of the client computer system.

* * * * *